US011924825B2

(12) United States Patent
Bhattad et al.

(10) Patent No.: US 11,924,825 B2
(45) Date of Patent: *Mar. 5, 2024

(54) CONFIGURING A STARTING OFFSET FOR A CONFIGURED GRANT UPLINK COMMUNICATION

(71) Applicant: QUALCOMM Incorporated, San Diego, CA (US)

(72) Inventors: Kapil Bhattad, Bangalore (IN); Jing Sun, San Diego, CA (US); Xiaoxia Zhang, San Diego, CA (US); Ananta Narayanan Thyagarajan, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/805,712

(22) Filed: Jun. 7, 2022

(65) Prior Publication Data

US 2022/0377768 A1     Nov. 24, 2022

Related U.S. Application Data

(63) Continuation of application No. 16/821,678, filed on Mar. 17, 2020, now Pat. No. 11,382,116.

(30) Foreign Application Priority Data

Mar. 28, 2019   (IN) .............................. 201941012235
Aug. 21, 2019   (IN) .............................. 201941033642

(51) Int. Cl.
*H04W 72/04* (2023.01)
*H04L 5/00* (2006.01)
(Continued)

(52) U.S. Cl.
CPC ....... *H04W 72/1268* (2013.01); *H04L 5/0051* (2013.01); *H04L 5/10* (2013.01);
(Continued)

(58) Field of Classification Search
CPC ......... H04W 72/1268; H04W 72/0446; H04W 72/23; H04W 72/21; H04W 74/0808;
(Continued)

(56) References Cited

U.S. PATENT DOCUMENTS 9,929,834 B2    3/2018  Chen et al.
11,382,116 B2*  7/2022  Bhattad ................. H04W 72/23
(Continued)

FOREIGN PATENT DOCUMENTS

CN      107872804 A    4/2018
CN      107926028 A    4/2018
(Continued)

OTHER PUBLICATIONS

"3GPP TS 38.133, V15.4.0, 3rd Generation Partnership Project; Technical Specification Group Radio Access Network; NR; Requirements for support of radio resource management (Release 15)", Dec. 2018, 801 pages.
(Continued)

*Primary Examiner* — Candal Elpenord
(74) *Attorney, Agent, or Firm* — Dalei Dong; Harrity & Harrity, LLP

(57) ABSTRACT

Various aspects of the present disclosure generally relate to wireless communication in a shared spectrum. In some aspects, a user equipment may receive an indication of a set of starting offsets for an uplink communication, wherein the set of starting offsets includes at least one negative starting offset relative to a start of a slot or a mini-slot in which the uplink communication is configured to start; select a starting offset from the set of starting offsets; and transmit the uplink
(Continued)

communication, wherein the uplink communication starts at a time indicated by the selected starting offset. Numerous other aspects are provided.

21 Claims, 20 Drawing Sheets

(51) Int. Cl.
*H04L 5/10* (2006.01)
*H04L 27/26* (2006.01)
*H04W 72/0446* (2023.01)
*H04W 72/1268* (2023.01)
*H04W 72/14* (2009.01)
*H04W 72/23* (2023.01)

(52) U.S. Cl.
CPC ..... *H04L 27/2607* (2013.01); *H04W 72/0446* (2013.01); *H04W 72/23* (2023.01)

(58) Field of Classification Search
CPC ....... H04L 5/0051; H04L 5/10; H04L 5/0092; H04L 27/2607
USPC .................................................. 370/329–330
See application file for complete search history.

(56) References Cited

U.S. PATENT DOCUMENTS

| | | | |
|---|---|---|---|
| 2016/0143014 A1 | 5/2016 | Mukherjee et al. | |
| 2017/0231006 A1 | 8/2017 | Yin et al. | |
| 2018/0191547 A1 | 7/2018 | Mukherjee et al. | |
| 2018/0206262 A1 | 7/2018 | Cao et al. | |
| 2018/0302926 A1 | 10/2018 | Bhorkar et al. | |
| 2018/0352527 A1 | 12/2018 | Wang et al. | |
| 2019/0045495 A1 | 2/2019 | Chen et al. | |
| 2019/0159256 A1 | 5/2019 | Talarico et al. | |
| 2019/0166599 A1 | 5/2019 | Karaki et al. | |
| 2019/0268935 A1 | 8/2019 | Talarico et al. | |
| 2019/0306923 A1 | 10/2019 | Xiong et al. | |
| 2019/0313409 A1 | 10/2019 | Tian et al. | |
| 2020/0036586 A1 | 1/2020 | Gao et al. | |
| 2020/0178288 A1 | 6/2020 | Chang et al. | |
| 2020/0314815 A1* | 10/2020 | Kim ...................... | H04L 1/1864 |
| 2020/0314876 A1 | 10/2020 | Bhattad et al. | |
| 2020/0389916 A1 | 12/2020 | Salem et al. | |
| 2023/0009391 A1* | 1/2023 | Dinan ............... | H04W 72/0446 |

FOREIGN PATENT DOCUMENTS

| | | |
|---|---|---|
| EP | 3518604 A1 | 7/2019 |
| TW | 201844016 A | 12/2018 |
| WO | 2018036433 A1 | 3/2018 |
| WO | 2018173005 A1 | 9/2018 |
| WO | WO-2019014498 A1 | 1/2019 |
| WO | 2019034137 A1 | 2/2019 |

OTHER PUBLICATIONS

3GPP TS 38.213: "3rd Generation Partnership Project; Technical Specification Group Radio Access Network; NR; Physical Layer Procedures for Control (Release 15)", 3GPP Draft, 38213-F50, 3rd Generation Partnership Project (3GPP), Mobile Competence Centre, 650, Route Des Lucioles, F-06921 Sophia-Antipolis Cedex, France, vol. RAN WG1, No. V15.5.0 (Mar. 2019), Mar. 27, 2019 (Mar. 27, 2019), 104 Pages, XP051722950, XP051686992, Retrieved from the Internet: URL: http://www.3gpp.org/ftp/3guInternal/3GPP%5Fultimate%5Fversions%5Fto%5Fbe%5Ftransposed/sentToDpc/38213%2Df50%2Ezip [retrieved on Mar. 27, 2019] p. 12-p. 74, section 7.3.1.
GATT: "Configuration for Two-Intervals-SPS", 3GPP TSG RAN WG2 #63bis, 3GPP Draft; R2-085329, 3rd Generation Partnership Project (3GPP), Mobile Competence Centre; 650, Route Des Lucioles; F-06921 Sophia-Antipolis Cedex; France, No. Prague, Czech Republic; Sep. 23, 2008, Sep. 23, 2008 (Sep. 23, 2008), 5 Pages, Sep. 29-Oct. 3, 2008, XP050320193, [retrieved on Sep. 23, 2008] section 2.
International Search Report and Written Opinion—PCT/US2020/023284—ISA/EPO—dated Jun. 18, 2020.
Samsung: "On UL Transmission Timing Aspects", 3GPP TSG RAN WG1 Meeting 90bis, 3GPP Draft; R1-1717678 UL Transmission Timing, 3rd Generation Partnership Project (3GPP), Mobile Competence Centre; 650, Route Des Lucioles; F-06921 Sophia-Antipolis Cedex; France, vol. RAN WG1, No. Prague, CZ; Oct. 9-13, 2017, Oct. 8, 2017 (Oct. 8, 2017), 2 Pages, XP051340863, Retrieved from the Internet: URL: http://www.3gpp.org/ftp/Meetings_3GPP_SYNC/RAN1/Docs/ [retrieved on Oct. 8, 2017] section 2.
Taiwan Search Report—TW109108932—TIPO—dated Apr. 7, 2023.

* cited by examiner

CONFIGURING A STARTING OFFSET FOR A CONFIGURED GRANT UPLINK COMMUNICATION

CROSS-REFERENCE TO RELATED APPLICATIONS

This application is a continuation of U.S. patent application Ser. No. 16/821,678, filed Mar. 17, 2020, entitled "CONFIGURING A STARTING OFFSET FOR A CONFIGURED GRANT UPLINK COMMUNICATION," which claims priority to India Patent Application No. 201941012235, filed on Mar. 28, 2019, entitled "CONFIGURING A STARTING OFFSET FOR A CONFIGURED GRANT UPLINK COMMUNICATION," and India Patent Application No. 201941033642, filed on Aug. 21, 2019, entitled "CONFIGURING A STARTING OFFSET FOR A CONFIGURED GRANT UPLINK COMMUNICATION," the contents of which are incorporated herein by reference in their entireties.

FIELD OF THE DISCLOSURE

Aspects of the present disclosure generally relate to wireless communication and to techniques and apparatuses for configuring a starting offset for a configured grant uplink communication.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving an indication of a set of starting offsets for an uplink communication, wherein the set of starting offsets includes at least one negative starting offset relative to a start of a slot or a mini-slot in which the uplink communication is configured to start; selecting a starting offset from the set of starting offsets; and transmitting the uplink communication, wherein the uplink communication starts at a time indicated by the selected starting offset. In some aspects, the method includes performing a listen before talk procedure prior to the selected starting offset; and transmitting the uplink communication based at least in part on a determination that the listen before talk procedure is successful. In some aspects, the method includes dropping a scheduled uplink communication based at least in part on a determination that an uplink grant does not occur at least a threshold number of symbols before a symbol corresponding to the at least one negative starting offset.

In some aspects, a UE for wireless communication may include a memory and one or more processors operatively coupled to the memory. The memory and the one or more processors may be configured to receive an indication of a set of starting offsets for an uplink communication, wherein the set of starting offsets includes at least one negative starting offset relative to a start of a slot or a mini-slot in which the uplink communication is configured to start; select a starting offset from the set of starting offsets; and transmit the uplink communication, wherein the uplink communication starts at a time indicated by the selected starting offset. In some aspects, the memory and the one or more processors may be configured to perform a listen before talk procedure prior to the selected starting offset; and transmit the uplink communication based at least in part on a determination that the listen before talk procedure is successful. In some aspects, the memory and the one or more processors may be configured to drop a scheduled uplink communication based at least in part on a determination that an uplink grant does not occur at least a threshold number of symbols before a symbol corresponding to the at least one negative starting offset.

In some aspects, a non-transitory computer-readable medium may store one or more instructions for wireless communication. The one or more instructions, when executed by one or more processors of a UE, may cause the one or more processors to receive an indication of a set of starting offsets for an uplink communication, wherein the set of starting offsets includes at least one negative starting offset relative to a start of a slot or a mini-slot in which the uplink communication is configured to start; select a starting offset from the set of starting offsets; and transmit the uplink communication, wherein the uplink communication starts at a time indicated by the selected starting offset. In some aspects, the one or more instructions, when executed by one or more processors of a UE, may cause the one or more processors to perform a listen before talk procedure prior to the selected starting offset; and transmit the uplink communication based at least in part on a determination that the listen before talk procedure is successful. In some aspects, the one or more instructions, when executed by one or more processors of a UE, may cause the one or more processors to drop a scheduled uplink communication based at least in part on a determination that an uplink grant does not occur at least a threshold number of symbols before a symbol corresponding to the at least one negative starting offset.

In some aspects, an apparatus for wireless communication may include means for receiving an indication of a set of starting offsets for an uplink communication, wherein the set of starting offsets includes at least one negative starting offset relative to a start of a slot or a mini-slot in which the uplink communication is configured to start; means for selecting a starting offset from the set of starting offsets; and means for transmitting the uplink communication, wherein the uplink communication starts at a time indicated by the selected starting offset. In some aspects, the apparatus includes means for performing a listen before talk procedure prior to the selected starting offset; and means for transmitting the uplink communication based at least in part on a determination that the listen before talk procedure is successful. In some aspects, the apparatus includes means for dropping a scheduled uplink communication based at least in part on a determination that an uplink grant does not occur at least a threshold number of symbols before a symbol corresponding to the at least one negative starting offset.

In some aspects, the starting offset is randomly selected from the set of starting offsets. In some aspects, the uplink communication is a configured grant uplink (CG-UL) communication. In some aspects, transmitting the CG-UL communication comprises: transmitting, in a first symbol that includes the time at which the CG-UL communication starts, an extended cyclic prefix of a second symbol that follows the first symbol; and transmitting the CG-UL communication in at least the second symbol. In some aspects, transmitting the CG-UL communication comprises: transmitting, in a first mini-slot or a first slot that includes the time at which the CG-UL communication starts, an extended cyclic prefix of a starting symbol of a second mini-slot that follows the first mini-slot or of a second slot that follows the first slot; and transmitting the CG-UL communication in at least the second mini-slot or the second slot.

In some aspects, the set of starting offsets span multiple symbols. In some aspects, the set of starting offsets span one or more symbols of a slot or a mini-slot prior to the slot or the mini-slot in which the uplink communication is configured to start. In some aspects, the set of starting offsets is based at least in part on a demodulation reference signal configuration for the UE. In some aspects, an uplink grant for a scheduled uplink communication is required to occur at least a threshold number of symbols before a symbol corresponding to the at least one negative starting offset. In some aspects, the threshold number is based at least in part on a UE processing capability.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a description, briefly summarized above, may be had by reference to aspects, some of which are illustrated in the appended drawings. It is to be noted, however, that the appended drawings illustrate only some aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art.

Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
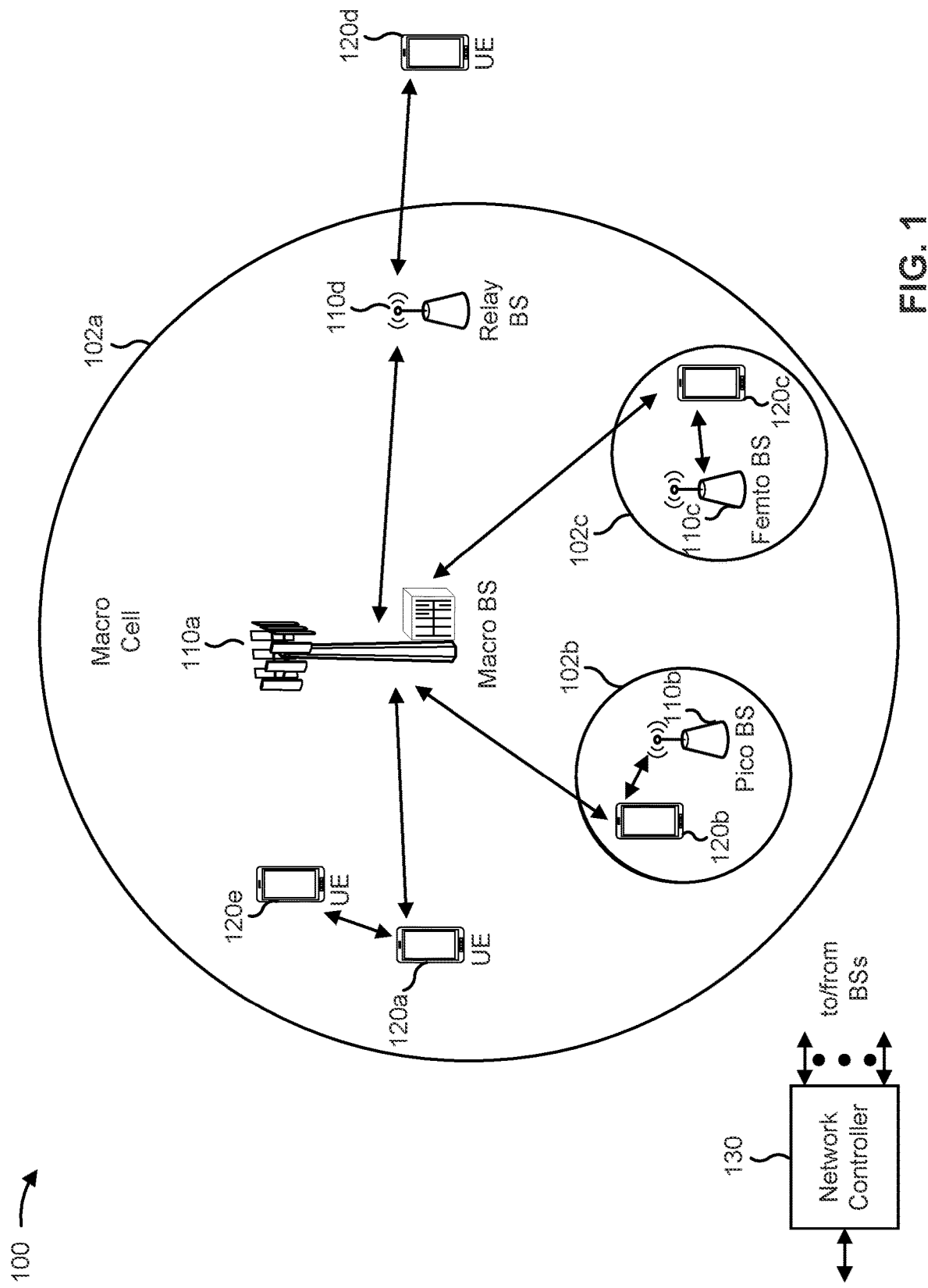
FIG. 1 is a diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
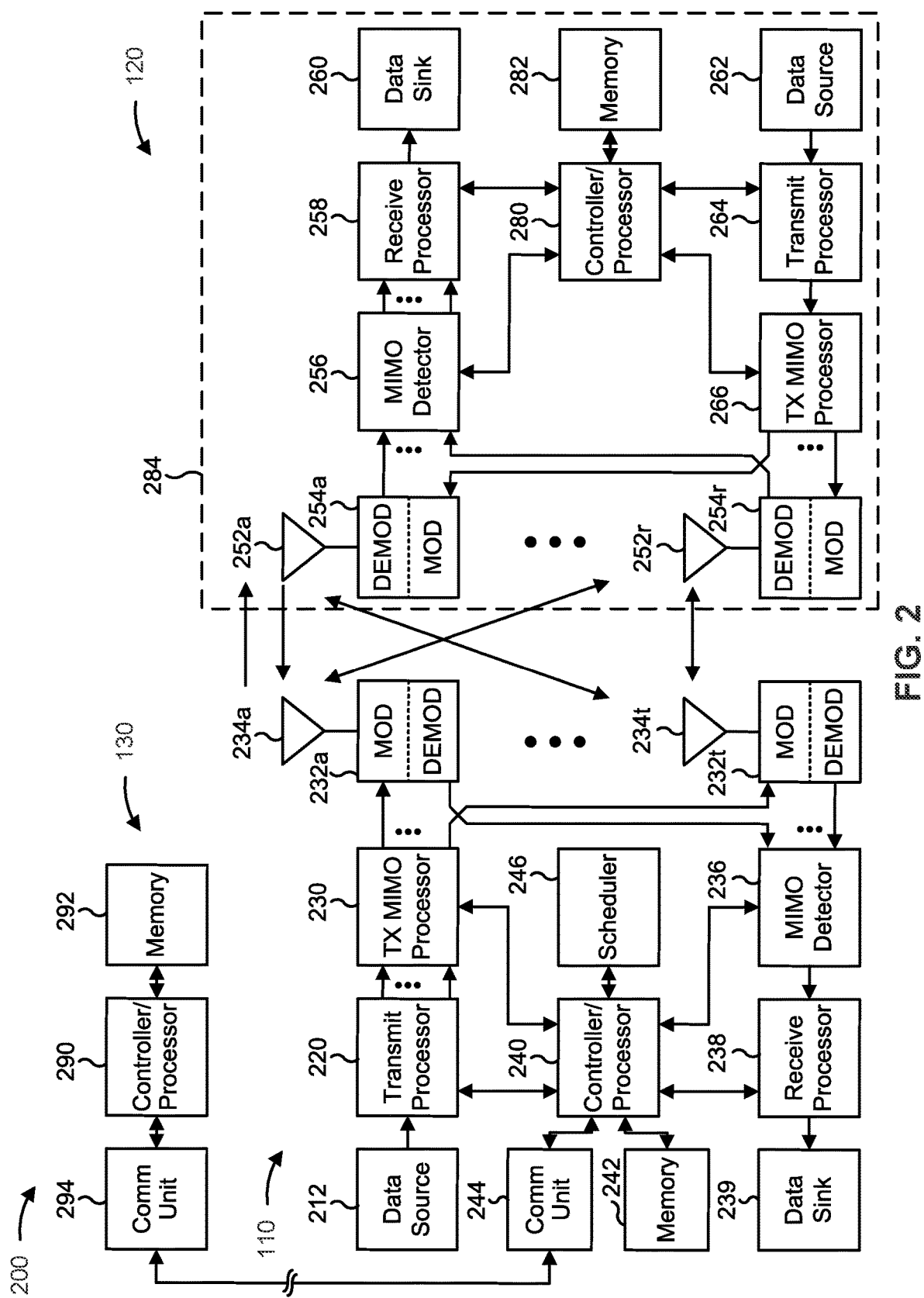
FIG. 2 is a diagram illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general T>1 and R>1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with configuring a starting offset for a configured grant uplink (CG-UL) communication, as described in more detail elsewhere herein. For example, controller/processor 240 of base station 110, controller/processor 280 of UE 120, and/or any other component(s) of FIG. 2 may perform or direct operations of, for example, process 1300 of FIG. 13, process 1400 of FIG. 14, process 1500 of FIG. 15, process 1600 of FIG. 16, process 1700 of FIG. 17, process 1800 of FIG. 18, and/or other processes as described herein. Memories 242 and 282 may store data and program codes for base station 110 and UE 120, respectively. A scheduler 246 may schedule UEs for data transmission on the downlink and/or uplink.

In some aspects, an apparatus for wireless communication (e.g., UE 120) may include means for receiving an indication of a set of starting offsets for an uplink communication, wherein the set of starting offsets includes at least one negative starting offset relative to a start of a slot or a mini-slot in which the uplink communication is configured to start; means for selecting a starting offset from the set of starting offsets; means for transmitting the uplink communication, wherein the uplink communication starts at a time indicated by the selected starting offset; and/or the like. Additionally, or alternatively, the apparatus for wireless communication may include means for identifying a set of starting offsets for a configured grant uplink (CG-UL) communication based at least in part on: a sub-carrier spacing configured for the apparatus, a slot type configured for the apparatus, wherein the slot type indicates whether the apparatus is configured with slot-based scheduling or mini-slot-based scheduling, a demodulation reference signal (DMRS) configuration for the apparatus, or a combination thereof; means for identifying a starting offset from the set of starting offsets; means for transmitting the CG-UL communication, wherein the CG-UL communication starts at a time indicated by the identified starting offset; and/or the like. Additionally, or alternatively, the apparatus for wireless communication may include means for identifying a set of starting offsets for a configured grant uplink (CG-UL) communication based at least in part on at least one of a sub-carrier spacing or a slot type configuration for the UE, wherein the slot type configuration includes slot-based scheduling or mini-slot-based scheduling; means for identifying a starting offset from the set of starting offsets; means for transmitting the CG-UL communication, wherein the CG-UL communication starts at a time indicated by the identified starting offset; and/or the like. Additionally, or alternatively, the apparatus for wireless communication may include means for identifying a set of starting offsets for a configured grant uplink (CG-UL) communication based at least in part on a demodulation reference signal (DMRS) configuration for the apparatus; means for identifying a starting offset from the set of starting offsets; means for transmitting the CG-UL communication, wherein the CG-UL communication starts at a time indicated by the identified starting offset; and/or the like. Additionally, or alternatively, the apparatus for wireless communication may include means for transmitting an initial transmission of a configured grant uplink (CG-UL) communication in a first CG-UL resource; means for transmitting uplink control information (UCI) for a retransmission of the CG-UL communication that has a transport block size that is the same as the initial transmission of the CG-UL communication; means for transmitting the retransmission of the CG-UL communication in a second CG-UL resource; and/or the like. Additionally, or alternatively, the apparatus for wireless communication may include means for transmitting an initial transmission of a configured grant uplink (CG-UL) communication using a first starting offset; means for transmitting uplink control information (UCI) for a retransmission of the CG-UL communication that has a transport block size that is the same as the initial transmission of the CG-UL communication, wherein the UCI indicates the transport block size of the retransmission; means for transmitting the retransmission of the CG-UL communication using a second starting offset; and/or the like. In some aspects, such means may include one or more components of UE 120 described in connection with FIG. 2.

As indicated above, FIG. 2 is provided as an example. Other examples may differ from what is described with regard to FIG. 2.

Figure 3:
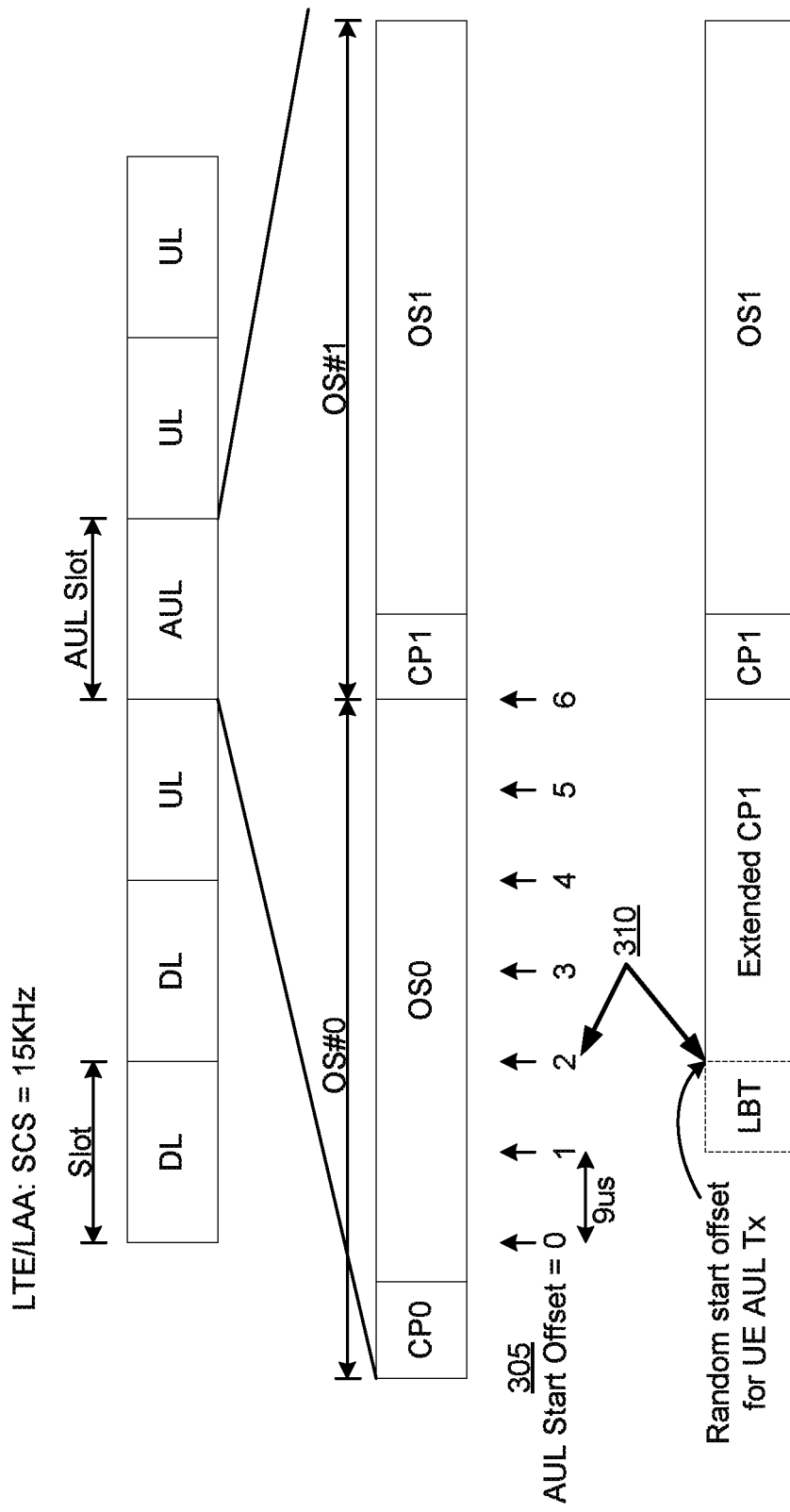
FIGS. 3-4 are diagrams illustrating examples of starting offsets for an autonomous uplink (AUL) communication, in accordance with various aspects of the present disclosure.

FIG. 3 is a diagram illustrating an example 300 of starting offsets for an autonomous uplink (AUL) communication, in accordance with various aspects of the present disclosure.

In a Licensed-Assisted Access (LAA) radio access technology (RAT) or another RAT that uses a licensed radio frequency (RF) band technology (e.g., LTE or the like) to access an unlicensed RF band (e.g., a Wi-Fi band), UEs 120 may contend for access to the unlicensed RF band. For example, a UE 120 contending for access to the unlicensed RF band may perform a listen-before-talk (LBT) procedure to detect an energy level on a channel of the unlicensed RF band before transmitting on the channel (sometimes referred to as a clear channel assessment (CCA) procedure). If the energy level satisfies a threshold (e.g., is greater than the threshold), then the UE 120 may refrain from transmitting on the channel for a period of time. If the energy level does not satisfy the threshold (e.g., is less than the threshold), then the UE 120 may transmit on the channel. Such a transmission is sometimes referred to as autonomous uplink (AUL) communication (or an AUL transmission) because the UE 120 transmits without first requesting an uplink grant (e.g., using a scheduling request) or receiving a dynamic uplink grant (e.g., in downlink control information (DCI)) that schedules the AUL communication. In some cases, an uplink grant (e.g., an AUL slot in which AUL communications are permitted) may be configured for the UE 120 by a base station 110 (e.g., in a radio resource control (RRC) message, system information, and/or the like).

To reduce the likelihood of collision between transmissions of multiple UEs 120 (e.g., due to simultaneous or concurrent transmissions of multiple UEs 120), a UE 120 may randomly select a starting offset for an AUL transmission of the UE 120. A starting offset may indicate a time at which the UE 120 is to transmit the AUL transmission (e.g., relative to a reference time, such as a start of a slot). For example, a base station 110 may configure the UE 120 with a set of starting offsets for AUL communications (e.g., by transmitting a configuration message, to the UE 120, that indicates the set of starting offsets), and the UE 120 may randomly (or pseudo-randomly) select a starting offset from the set. After selecting the starting offset, the UE 120 performs the LBT procedure for an LBT time period that occurs prior to the selected starting offset, and transmits the AUL communication at a time indicated by the starting offset if the LBT procedure is successful. Without using a random selection of a starting offset, multiple UEs 120 would perform the LBT procedure at the same time, and would determine that the channel (e.g., a physical uplink shared channel (PUSCH)) is clear because none of those UEs 120 is transmitting during the LBT time period. As a result, the multiple UEs 120 would transmit AUL communications at the same time, resulting in collision.

As shown by reference number 305 of FIG. 3, the UE 120 is configured with seven possible starting offsets, shown as 0 through 6. The starting offsets each indicate a different time relative to a start of a slot configured for AUL communications (shown as an AUL slot). For example, the starting offsets 0 through 6 may correspond to time offsets of 16 microseconds (μs), 25 μs, 34 μs, 43 μs, 52 μs, 61 μs, and a time corresponding to the end of the first OFDM symbol (OS) (and the beginning of the second OS) of the AUL slot. These starting offsets are separated by a fixed gap of, for example, 9 μs to permit an LBT procedure to be completed in an interval between consecutive starting offsets.

For example, as shown by reference number 310, if the UE 120 randomly selects a starting offset of 2 (e.g., corresponding to a time that is 34 μs after the start of the AUL slot), then the UE 120 may perform an LBT procedure in the interval between 25 μs (corresponding to a starting offset of 1) and 34 μs. If the LBT procedure is successful, then the UE 120 may transmit an AUL communication starting at 34 μs. As shown, the AUL communication may include an extended cyclic prefix (CP) in a portion of a first OFDM symbol (shown as OS0) from the selected starting offset to the end of the first OFDM symbol, may include a CP in a second OFDM symbol (shown as OS1), and may include data of the AUL communication in the second OFDM symbol (and possibly in one or more symbols subsequent to the second OFDM symbol).

In example 300, a sub-carrier spacing (SCS) configured for communications of the UE 120 is 15 kilohertz (kHz). This SCS permits the entire set of seven starting offsets to occur in a single symbol (with the last starting offset occurring at the end of the symbol and the beginning of the next symbol). However, for other sub-carrier spacings (e.g., 30 kHz, 60 kHz, 120 kHz, and/or the like) and/or for different slot type configurations that use non-slot-based scheduling (e.g., mini-slot-based scheduling), this set of starting offsets may span multiple symbols, and the starting offsets may not be permitted to be separated by a shorter interval due to the fixed gap needed to perform the LBT procedure between consecutive starting offsets. Furthermore, different sub-carrier spacings and/or slot type configurations may use different demodulation reference symbol (DMRS) configurations that may result in DMRSs that overlap with a transmission period that starts in a starting offset, which would reduce the accuracy of channel quality measurements if a DMRS is dropped in favor of an AUL transmission. Some techniques and apparatuses described herein address these and other issues presented by increased complexity and flexible configurations introduced by, for example, an NR RAT or a similar type of RAT.

As indicated above, FIG. 3 is provided as an example. Other examples may differ from what is described with regard to FIG. 3.

Figure 4:
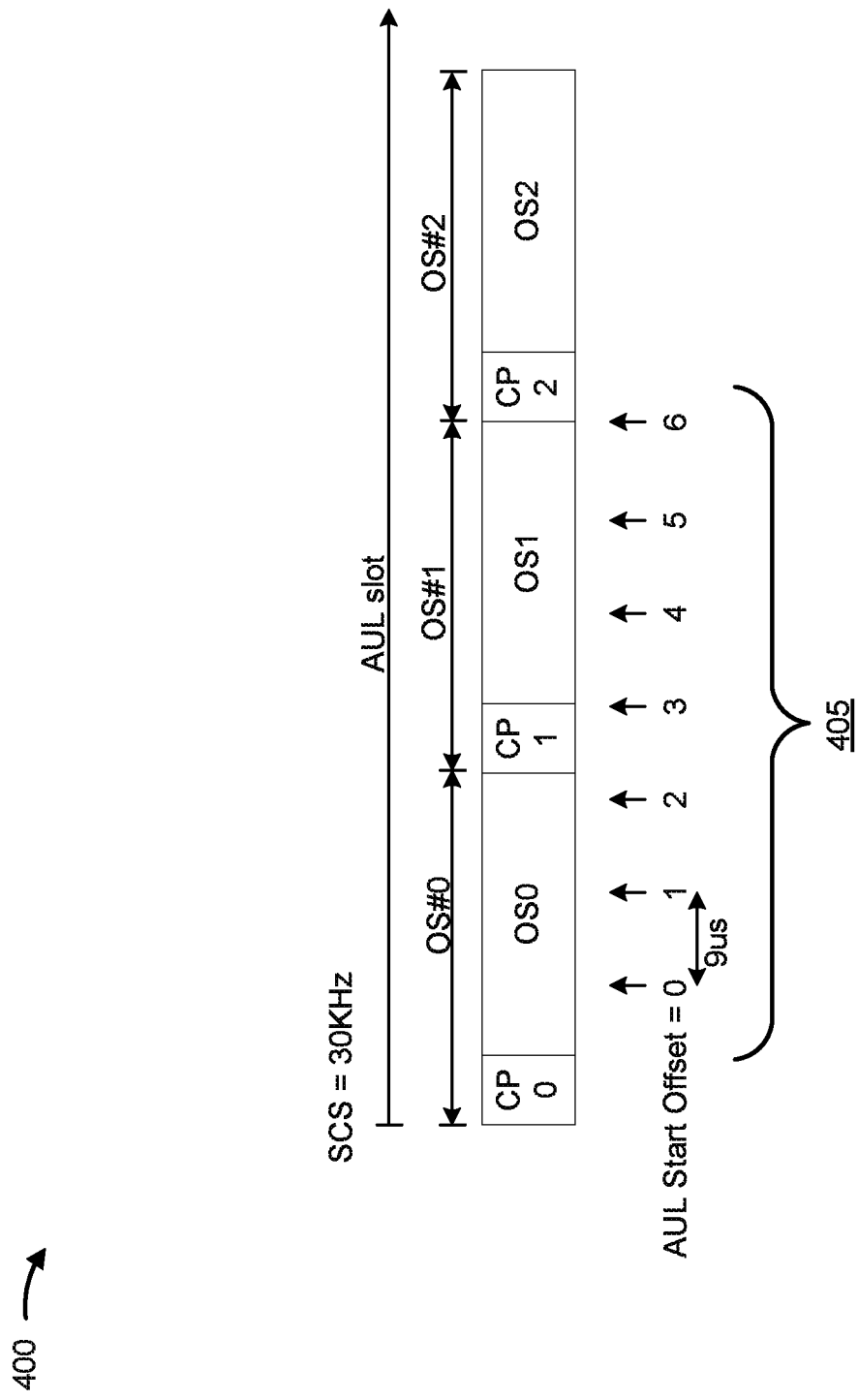

FIG. 4 is a diagram illustrating another example 400 of starting offsets for an AUL communication, in accordance with various aspects of the present disclosure.

As indicated above in connection with FIG. 3, a sub-carrier spacing other than 15 kHz may result in a set of AUL starting offsets that span multiple symbols. For example, as shown by reference number 405, the set of starting offsets may span two symbols (OS0 and OS1) for a sub-carrier spacing of 30 kHz. This may introduce complexities and different options for handling AUL communications (sometimes referred to as configured grant uplink (CG-UL) communications in, for example, an NR RAT) to enhance performance, as described in more detail below.

As indicated above, FIG. 4 is provided as an example. Other examples may differ from what is described with regard to FIG. 4.

Figure 5:
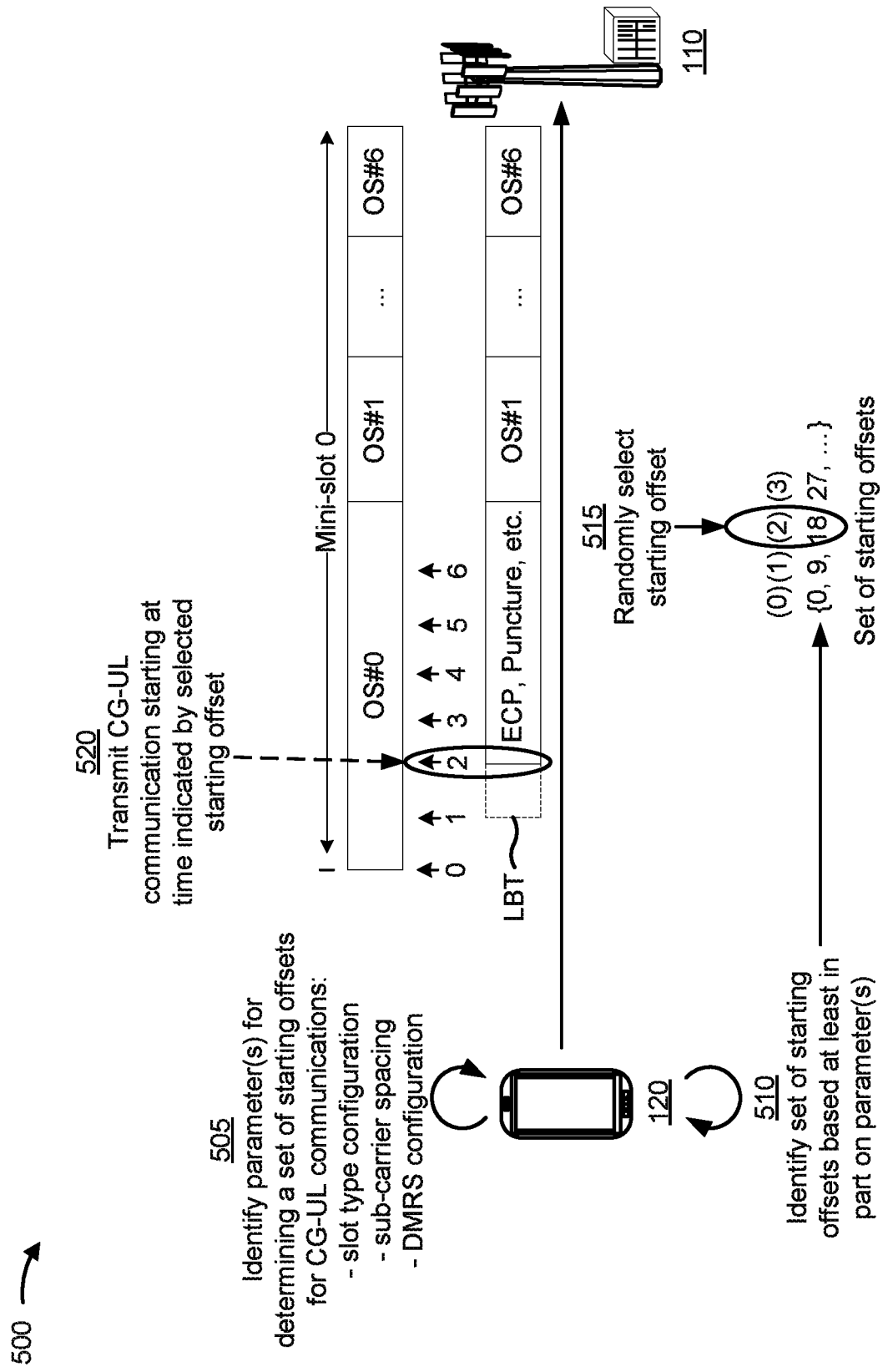
FIGS. 5-12 are diagrams illustrating examples of configuring a starting offset for a configured grant uplink (CG-UL) communication, in accordance with various aspects of the present disclosure.

FIG. 5 is a diagram illustrating an example 500 of configuring a starting offset for a CG-UL communication, in accordance with various aspects of the present disclosure. In general, AUL may refer to a procedure in an LTE RAT (e.g., using LAA) where a UE 120 transmits a communication on an unlicensed RF band without first requesting an uplink grant (e.g., using a scheduling request (SR)) or receiving a dynamic uplink grant (e.g., in DCI) that schedules the communication. Similarly, CG-UL may refer to a similar procedure in an NR RAT. The term CG-UL refers to the UE 120 being configured (e.g., using an RRC message, system information, and/or the like) with transmission time intervals (TTIs) (e.g., slots, mini-slots, and/or the like) that are available for CG-UL communications without the need for an SR and/or a dynamic uplink grant (e.g., in DCI) specific to a CG-UL communication. However, the terms AUL and CG-UL may be used interchangeably to refer to such a procedure independent of a RAT in which the procedure is performed. Furthermore, although some operations are described herein in connection with AUL communications and CG-UL communications, in some aspects, one or more of these operations may be performed in connection with another type of uplink communication, such as a scheduled uplink communication.

As shown by reference number 505, a UE 120 may identify one or more parameters for determining a set of starting offsets for CG-UL communications. For example, the one or more parameters may include a slot type configuration for the UE 120, a sub-carrier spacing configured for the UE 120, a DMRS configuration for the UE 120, and/or the like. A slot type configuration may refer to whether the UE 120 is configured with slot-based scheduling, whether the UE 120 is configured with non-slot-based scheduling (e.g., whether the UE 120 is configured with mini-slot-based scheduling), a slot size (e.g., 14 symbols or a different number of symbols), a mini-slot size (e.g., 7 symbols, 4 symbols, 2 symbols, or a different number of symbols), and/or the like. A sub-carrier spacing may include, for example, 15 kHz, 30 kHz, 60 kHz, 120 kHz, 240 kHz, or the like. The DMRS configuration may include, for example, a DMRS pattern that indicates one or more resource blocks for DMRS transmissions, a DMRS location (e.g., a time domain location of DMRS transmissions), a number of DMRSs (e.g., in a TTI, such as a slot or a mini-slot), and/or the like.

As shown by reference number 510, the UE 120 may identify a set of starting offsets (e.g., a set of permitted starting offsets) for a CG-UL communication based at least in part on the one or more parameters. The UE 120 may identify different sets of starting offsets for different slot type configurations, different sub-carrier spacings, different DMRS configurations, and/or different combinations thereof. Additionally, or alternatively, the UE 120 may receive an indication of the set of starting offsets from a base station 110, such as in a configuration message (e.g., an RRC message).

As shown by reference number 515, the UE 120 may identify a starting offset from the set of starting offsets, such as by randomly (e.g., pseudo-randomly) selecting a starting offset from the set of starting offsets. In example 500, the first four starting offsets (shown as 0 through 3) are shown as 0 µs, 9 µs, 18 µs, and 27 µs, and the UE 120 is shown as randomly selecting starting offset 2, corresponding to a start time of 18 µs.

As shown by reference number 520, the UE 120 may transmit a CG-UL communication based at least in part on the identified (e.g., selected) starting offset. For example, the UE 120 may start transmission of the CG-UL communication at a start time indicated by the identified starting offset. In example 500 where the UE 120 selects starting offset 2 (e.g., 18 µs from the start of a TTI configured for CG-UL, shown as mini-slot 0), the UE 120 performs an LBT procedure before starting offset 2 (e.g., before 18 µs). If the LBT procedure is successful, then the UE 120 transmits the CG-UL communication starting at 18 µs. The UE 120 may transmit the CG-UL communication in a different manner depending on, for example, a slot type configuration of the UE 120, a sub-carrier spacing configured for the UE 120, a DMRS configuration of the UE 120, and/or the like, as described in more detail below.

In some aspects, the UE 120 may identify the set of starting offsets based at least in part on a DMRS configuration and/or a slot type configuration. For example, in slot-based scheduling, DMRS may be located in a third symbol of a slot (OS2) or a fourth symbol of a slot (OS3) for slot-based scheduling, depending on information indicated in a physical broadcast channel (PBCH). In some aspects, the set of starting offsets (e.g., a set of valid starting offsets) may depend on the DMRS location. For example, only starting offsets that occur prior to the start of the DMRS (e.g., a first DMRS) may be valid. In this case, fewer starting offsets may be included in the set of starting offsets when the DMRS is located on OS2, and more starting offsets may be included in the set of starting offsets when the DMRS is located on OS3.

In mini-slot-based scheduling, the DMRS may occur in the first symbol of a mini-slot. In this case, the UE 120 may disable multiple starting offsets, and may configure the set of starting offsets to include only a single starting offset so as not to puncture the DMRS, which would lead to inaccurate channel estimation. In some aspects, the UE 120 may disable multiple starting offsets if the DMRS configuration for mini-slot-based scheduling includes a single DMRS. However, if the DMRS configuration includes multiple DMRS, then the UE 120 may enable multiple starting offsets. In this case, the set of starting offsets may be configured so that at least one DMRS, of the multiple DRMS, is not punctured. When the UE 120 is configured with PUSCH hopping, then the UE 120 may enable multiple starting offsets when the multiple DMRS occur in the same half-slot.

Alternatively, in mini-slot-based scheduling, the UE 120 may transmit DMRS after the selected starting offset or after a latest-occurring starting offset included in the set of starting offsets. In this way, channel estimation may be performed. In some aspects, to avoid ambiguity between the UE 120 and the base station 110 regarding time domain locations of DMRS(s), the DMRS configuration (which may be indicated to the UE 120 by the base station 110) may indicate different time domain locations for DMRS transmissions for different starting offsets. For example, if the starting offset occurs in symbol 0, then a DMRS transmission may be configured to occur in symbol 1, and if the starting offset occurs in symbol 1, then the DMRS transmission may be configured to occur in symbol 2.

In some aspects, the DMRS may indicate information associated with the selected starting offset. For example, when different time domain locations are configured for different starting offsets, a time domain location in which the base station 110 receives the DMRS (e.g., after blind decoding) may indicate a starting offset (or a subset of the set of starting offsets) used by the UE 120.

In some aspects, the UE 120 may be configured with CG resources that occur concurrently across multiple carriers and/or sub-bands. In this case, the UE 120 may use such configured CG resources for higher data rate and/or to provide diversity in the case of LBT failure. In some aspects, the UE 120 may transmit independent TBs on these CG resources (e.g., on multiple carriers and/or sub-bands) concurrently (e.g., at the same time). In this case, the UE 120 may select the same starting offset across all CG resources that are expected to be used in parallel (e.g., for all carriers and/or sub-bands).

In some aspects, the UE 120 may transmit on a CG resource (e.g., a carrier and/or sub-band), of the configured CG resources based at least in part on an outcome of an LBT procedure. For example, the UE 120 may perform LBT on a first CG resource. If the LBT procedure fails, then the UE 120 may perform LBT on a second CG resource, and so on until the LBT procedure succeeds. In this case, selection of a starting offset for a CG resource may be independent of a starting offset selected for another CG resource (e.g., starting offsets selected for different carriers and/or sub-bands may be different). However, in some aspects, the UE 120 may select the same starting offset for each CG resource in different sub-bands for simplicity and/or to improve processing.

In some aspects, the UE 120 may prepare a packet for each CG resource (e.g., in different sub-bands with possibly different starting offsets), and may transmit a packet on the CG resource for which LBT succeeds. However, this may require additional processing resources of the UE 120 as compared to preparing a single packet and transmitting that packet on the CG resource for which LBT succeeds. Thus, in some aspects, the CG resources may be configured to permit this, such as by configuring the CG resources with a same resource allocation size and/or the like. Additionally, or alternatively, one or more scrambling sequences (e.g., for data, for DMRS, and/or the like) may be independent of the CG resource (e.g., the frequency resource(s) of the carrier and/or sub-band) being used for the CG communication.

As indicated above, FIG. 5 is provided as an example. Other examples may differ from what is described with regard to FIG. 5.

Figure 6:
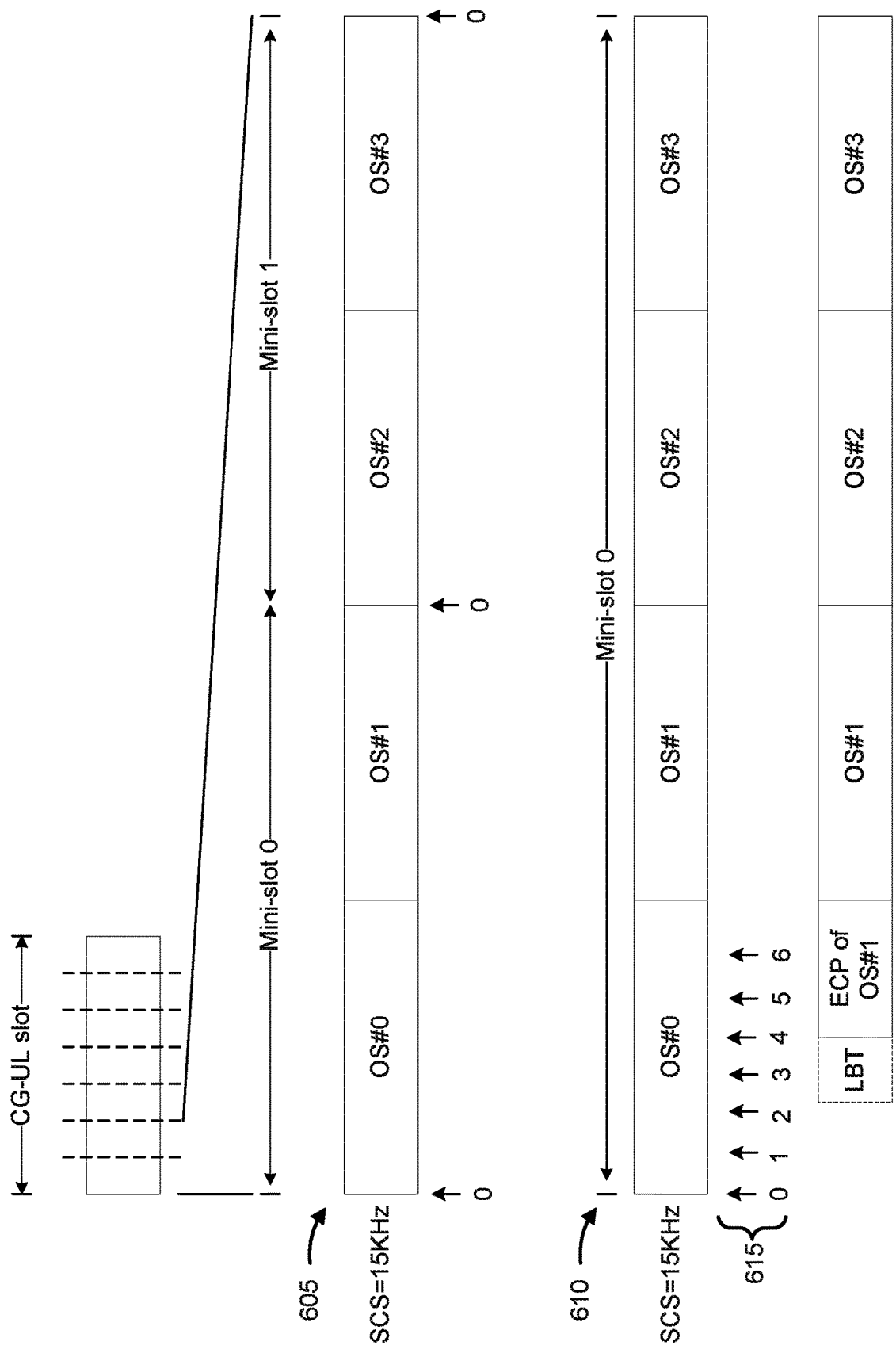

FIG. 6 is a diagram illustrating examples 605 and 610 of configuring a starting offset for a CG-UL communication, in accordance with various aspects of the present disclosure.

As shown by example 605, in some aspects, the UE 120 may disable the use of multiple starting offsets based at least in part on the slot type configuration of the UE 120. For example, when the UE 120 is configured with mini-slot-based scheduling, the UE 120 may disable the use of multiple starting offsets. In this case, the UE 120 may configure the set of starting offsets to include only a single starting offset based at least in part on a determination that the UE is configured with mini-slot-based scheduling. Additionally, or alternatively, the UE 120 may configure the set of starting offsets to include only a single starting offset based at least in part on a determination that the DMRS configuration for the UE 120 includes only a single DMRS (e.g., for slot-based scheduling or mini-slot-based scheduling). The single starting offset is shown in FIG. 6 as indicating a time at the beginning of a mini-slot because using other starting offsets will puncture the DMRS in the first symbol for the mini-slot based scheduling.

As shown by example 610, in some aspects, the UE 120 may enable the use of multiple starting offsets based at least in part on a slot type configuration and/or a DMRS configuration of the UE 120. For example, if the UE 120 is configured with a slot type configuration (e.g., mini-slot-based scheduling) that includes multiple DMRSs (e.g., more than one DMRS in a TTI, such as a mini-slot), then the UE 120 may enable the use of multiple starting offsets. In this case, the UE 120 may configure the set of starting offsets to include multiple starting offsets based at least in part on a determination that the DMRS configuration includes multiple DMRSs. In this way, channel estimation may still be performed for the TTI even if one of the DMRS is dropped (e.g., for transmission of the CG-UL). As shown, in some aspects, the UE 120 may transmit, in a first symbol (e.g., OS #0) that includes the start time for the CG-UL transmission, an extended cyclic prefix (ECP) of a second symbol (e.g., OS #1) that follows the first symbol. Additionally, or alternatively, the UE 120 may puncture the DMRS with the CG-UL communication (e.g., the ECP and/or data of the CG-UL communication) based at least in part on a determination that the DMRS configuration includes multiple DMRSs. The UE 120 may transmit data of the CG-UL communication in one or more remaining symbols of the TTI in which the ECP is not transmitted (shown as OS #1 through OS #3). In some aspects, the ECP may be transmitted (e.g., instead of front-loaded DMRS) if a starting offset other than 0 µs (e.g., a start of a symbol, a slot, a mini-slot, or another TTI) is selected.

As shown by reference number 615, in some aspects, the set of starting offsets (e.g., the set of times indicated by the set of starting offsets) may be included in a single TTI, such as a single mini-slot or a single slot.

As indicated above, FIG. 6 is provided as an example. Other examples may differ from what is described with regard to FIG. 6.

Figure 7:
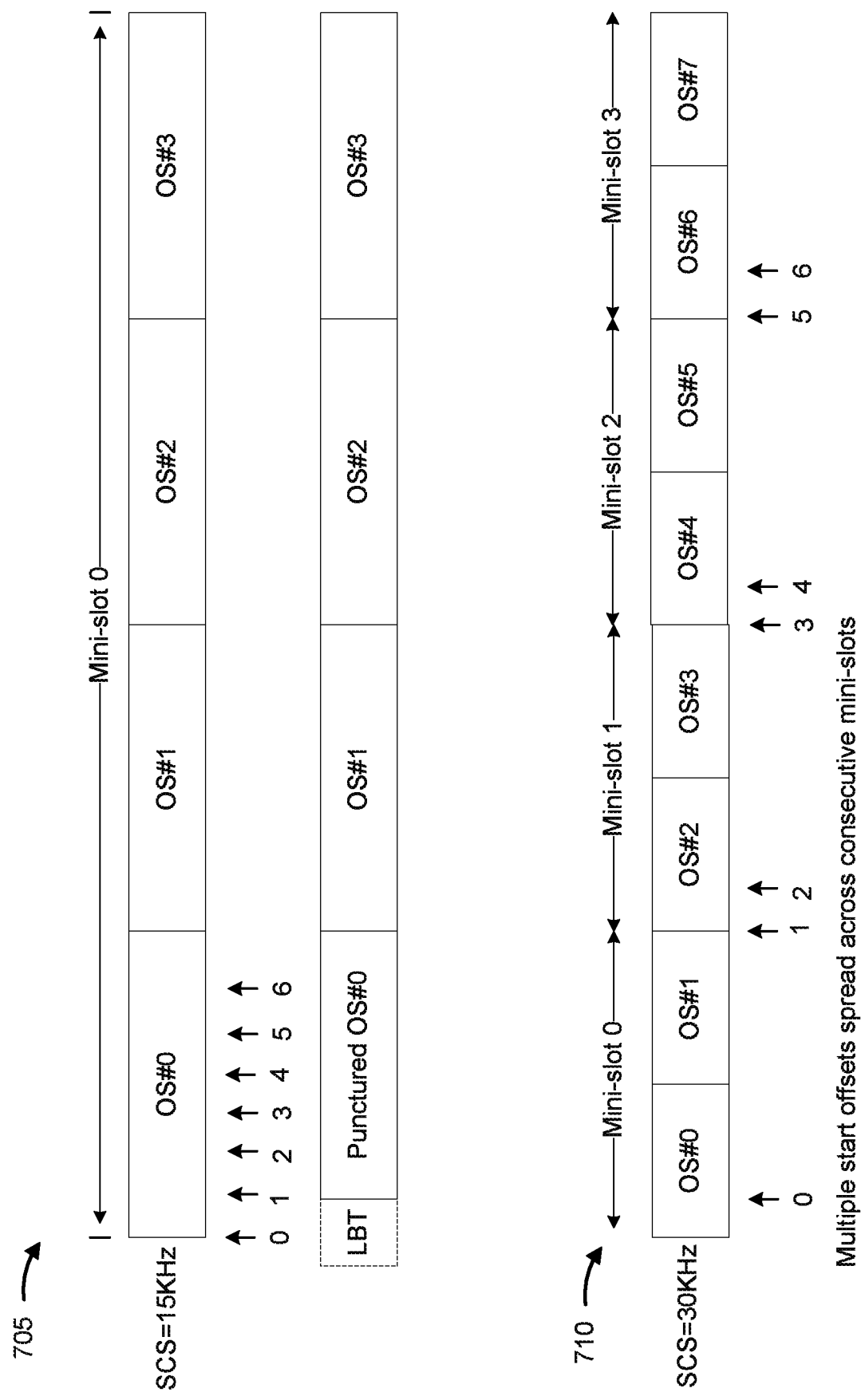

FIG. 7 is a diagram illustrating examples 705 and 710 of configuring a starting offset for a CG-UL communication, in accordance with various aspects of the present disclosure.

As shown by example 705, in some aspects, the UE 120 may puncture or truncate a portion of the TTI that occurs prior to the selected starting offset, and may transmit the remaining part of the TTI as a punctured TTI. For example, the UE 120 may truncate some initial part of the symbol to transmit a rest of the symbol in which the starting offset occurs rather than transmit an ECP on that symbol (e.g., as described above in connection with example 610 of FIG. 6). As shown, if the UE 120 selects starting offset 1 in OS #0, then the UE 120 may transmit a punctured symbol in OS #0 (e.g., by truncating an initial portion before the starting offset if the starting offset is small compared to the symbol duration).

In some aspects, the UE 120 may determine whether to transmit an ECP in the symbol in which the starting offset occurs or whether to puncture the symbol based at least in part on the selected starting offset. For example, the UE 120 may transmit an ECP if the starting offset occurs later in time (e.g., later than a threshold), and may puncture the symbol if the starting offset occurs earlier in time (e.g., earlier than a threshold). In some aspects, if the starting offset is greater than 1, then the UE 120 may transmit an ECP of the next symbol.

As shown by example 710, in some aspects, the set of starting offsets may span multiple TTIs (e.g., multiple mini-slots, multiple slots, or the like). In some aspects, the starting offsets all occur in the first symbol of a TTI, but may occur in different TTIs, as shown. In this example, if the UE selects starting offset 0, then the UE 120 can transmit in all four mini-slots (mini-slot 0 through mini-slot 3). If the UE 120 selects starting offset 1 or 2, then the UE 120 can transmit in mini-slots 1, 2, and 3. If the UE 120 selects starting offset 3 or 4, then the UE 120 can transmit in mini-slots 2 and 3. If the UE 120 selects starting offset 5 or 6, then the UE 120 can transmit only in mini-slot 3. In another example, if the UE 120 selects offset 1 or 2, then the UE 120 can transmit in mini-slot 1 only. If the UE 120 selects offset 3 or 4, then the UE 120 can transmit in mini-slot 2 only. This way, different UEs 120 can share the multiple CG-UL mini-slot resources.

As indicated above, FIG. 7 is provided as an example. Other examples may differ from what is described with regard to FIG. 7.

Figure 8:
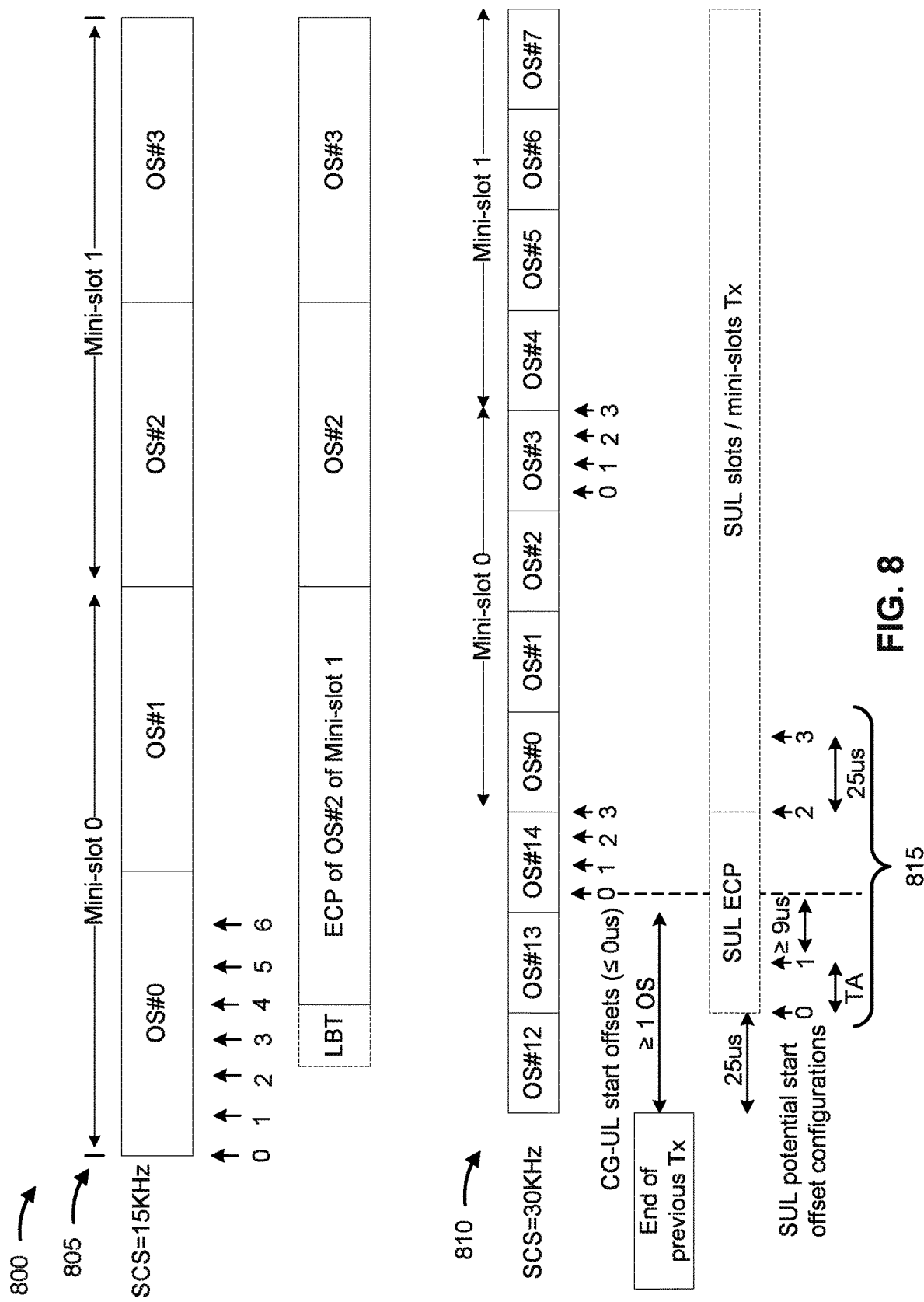

FIG. 8 is a diagram illustrating examples 805 and 810 of configuring a starting offset for a CG-UL communication, in accordance with various aspects of the present disclosure.

As shown by example 805, in some aspects, the UE 120 may transmit, in a first TTI (e.g., shown as mini-slot 0) that includes the start time for the CG-UL transmission, an ECP of a starting symbol (e.g., OS #2) of a second TTI (e.g., shown as mini-slot 1) that follows the first TTI. The UE 120 may transmit data of the CG-UL communication in at least the second TTI. In some aspects, the ECP may be transmitted if a starting offset other than 0 µs is selected. In some aspects, this operation may be performed by the UE 120 based at least in part on a size of the TTI. For example, the UE 120 may perform this operation for a TTI that is smaller than or equal to a threshold size (e.g., a mini-slot that is less than 7 symbols, that is less than 4 symbols, that is equal to 2 symbols, and/or the like).

As shown by example 810, in some aspects, the set of starting offsets includes at least one negative starting offset. The negative starting offset may be relative to a start of a TTI (shown as mini-slot 0) and/or a starting symbol of the TTI (shown as OS #0). In example 810, the set of starting offsets are all non-positive starting offsets (e.g., negative offsets or zero). The negative starting offsets are situated in a preceding TTI than a TTI for transmission of an uplink communication (e.g., a CG-UL communication). For example, the set of starting offsets 0, 1, and 2 in symbol OS #3 of mini-slot 0 are negative offsets relative to mini-slot 1 (e.g., OS #4 of mini-slot 1) because the set of starting offsets 0, 1, and 2 occur prior to the starting symbol OS #4 of mini-slot 1. The starting offset 3 is a zero offset because it occurs at the start of mini-slot 1 (e.g., on a boundary between OS #3 and OS #4). A similar example is shown with respect to OS #14, which occurs prior to mini-slot 0, and OS #0, which occurs within mini-slot 0. In example 810, starting offset 0 corresponding to a starting offset of −27 s, starting offset 1 corresponds to a starting offset of −18 µs, starting offset 2 corresponds to a starting offset of −9 µs, and starting offset 3 corresponds to a starting offset of 0 µs, where all starting offsets are relative to the start of a mini-slot, such as mini-slot 0 and OS #0 or mini-slot 1 and OS #4. In some aspects, the set of starting offsets may span one or more symbols (e.g., one symbol or two symbols) of the prior mini-slot. In this case, the UE 120 may transmit an ECP of OS #0 of mini-slot 0 in one or more symbols (e.g., OS #13, OS #14, and/or the like) of a mini-slot that precedes mini-slot 0. In some aspects, the set of starting offsets is indicated to the UE 120 by a base station 110, as described elsewhere herein.

When a negative offset is used, to prevent transmissions that occur prior to mini-slot 0 from blocking transmissions of the UE 120, a base station 110 may schedule transmissions to avoid the starting offsets. For example, in example 810, to allow negative offsets 0, 1, and 2 for mini-slot 1, which occur in OS #3 of mini-slot 0, the last symbol of mini-slot 0 can be punctured. In some aspects, the base station 110 may configure UEs 120 (e.g., in an RRC message and/or the like) to either use or refrain from using the final one or more symbols of AUL TTIs that overlap with AUL starting offsets for a next AUL TTI.

By using a negative offset, DMRS may be transmitted in the first symbol of a TTI to assist with channel estimation (e.g., front-loaded DMRS to reduce buffering of data until channel estimation is performed). Furthermore, negative offsets may assist with easier transport block (TB) size determination (e.g., using fewer processing and/or memory resources) by making the TB size determination independent of a selected starting offset. In some aspects, negative offsets may be used for some combinations of slot type configurations and/or DMRS configurations. For example, negative offsets may be configured for slot-based scheduling when DMRS occurs on OS #2 (e.g., the third symbol of a TTI), thereby preventing the DMRS from being punctured. Conversely, negative offsets may not be configured for slot-based scheduling when DMRS occurs on OS #3 (e.g., the fourth symbol of a TTI). In some aspects, negative offsets may be used for mini-slot-based scheduling since the DMRS occurs in the first symbol of the mini-slot.

In some aspects, to prioritize scheduled uplink (SUL) communications (e.g., the use an SR and/or a dynamic uplink grant) over CG-UL communications, a UE 120 transmitting an SUL communication may be configured to transmit an ECP of the SUL communication, and may be configured to transmit the ECP to start before the first starting offset (e.g., starting offset 0) of the CG-UL communications. In this way, a UE 120 performing an LBT procedure for a CG-UL communication would detect the ECP of the SUL transmission and refrain from transmitting the CG-UL communication, thereby prioritizing the SUL communication and reducing interference. However, to prevent the actual SUL communication from interfering with a subsequent CG-UL communication, the UE 120 transmitting the SUL communication may be configured to finish the SUL communication prior to a first starting offset (e.g., starting offset 0) associated with a subsequent TTI.

In some aspects, the SUL communication may be configured with a starting offset relative to a starting symbol of a TTI. As shown by reference number 815, example starting offsets include 0 μs (e.g., a start of the TTI, shown by starting offset 2), 25 μs (shown by starting offset 3), 0 μs plus a timing advance (TA) value (not shown), 25 μs plus the TA value, −36 μs (shown by starting offset 1), −36 μs minus the TA value (shown by starting offset 0), and/or the like, in order to prioritize the SUL over the CG-UL, where the first starting offset of the CG-UL may be at −27 μs. In some aspects, the starting offsets for the SUL communication may be signaled to a UE 120 by a base station 110, such as in DCI, an uplink grant, and/or the like. Thus, a set of starting offsets may include one or more negative values, one or more positive values, and/or a value of zero. For example, the set of starting offsets may include one or more negative values and one or more non-negative values (e.g., positive values or zero). In some aspects, the set of starting offsets includes only negative values. In some aspects, the set of starting offsets includes only non-positive values.

As indicated above, FIG. 8 is provided as an example. Other examples may differ from what is described with regard to FIG. 8.

Figure 9:
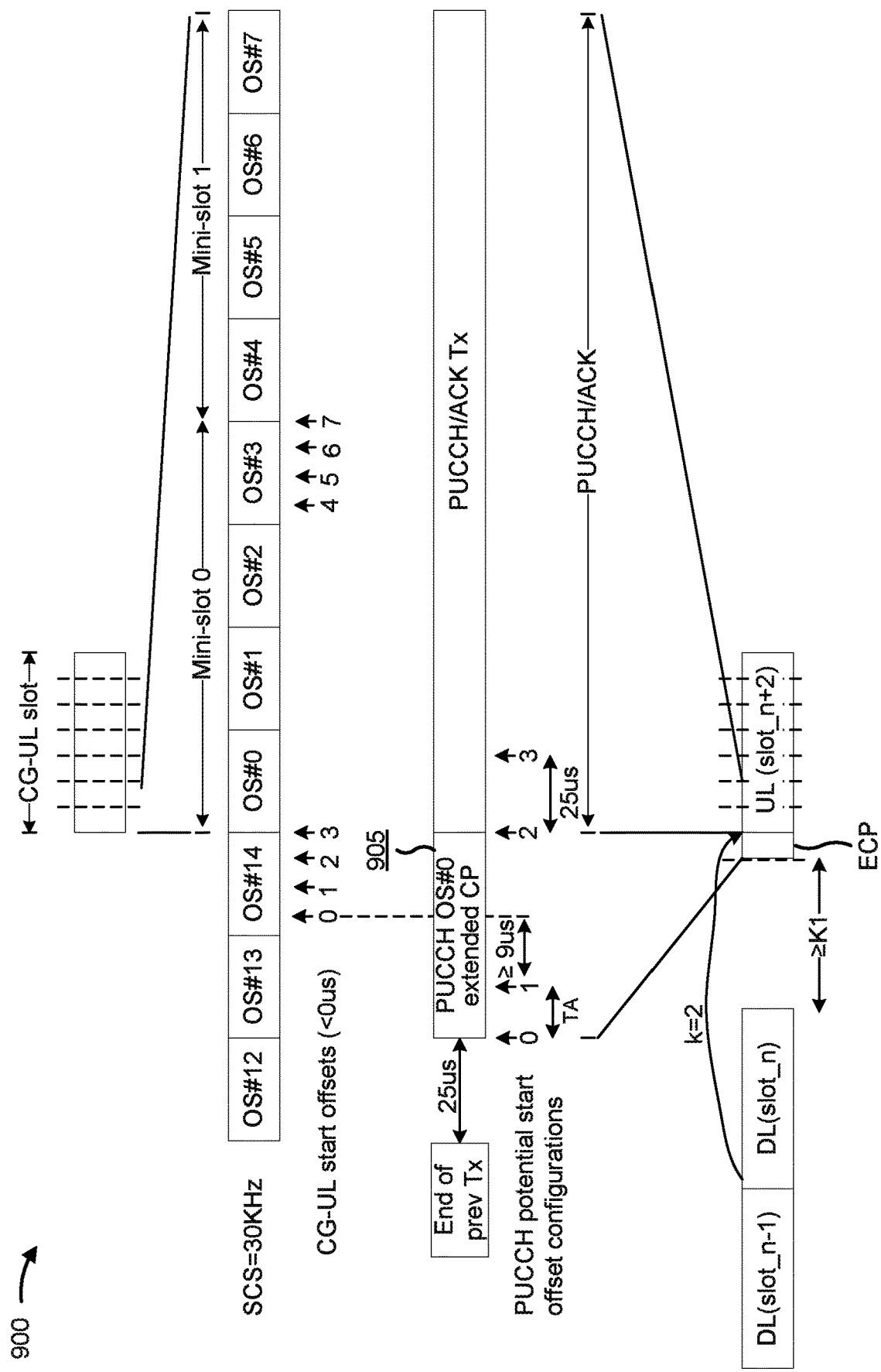

FIG. 9 is a diagram illustrating another example 900 of configuring a starting offset for a CG-UL communication, in accordance with various aspects of the present disclosure.

Due to timeline and processing considerations, if a PUSCH communication starts on a symbol, the grant for that PUSCH communication has to come K2 symbols before that symbol. The value of K2 represents a time between an uplink grant (e.g., in DCI) and an uplink data communication (e.g., a PUSCH communication) corresponding to the uplink grant. The value of K2 may be based at least in part on a UE capability. As described above in connection with example 810 of FIG. 8, to prioritize SUL over CG-UL, the SUL may be permitted to start before the CG-UL starting offsets using an ECP before the regular PUSCH transmission starts. In order to support this, the uplink grant for the SUL may be required to occur at least K2 symbols before the symbol containing the ECP part of the PUSCH of the SUL communication. In some aspects, the UE 120 may ignore grants that fail to satisfy this requirement even if that grant satisfies the K2 symbol requirement with respect to a non-ECP portion of the PUSCH (e.g., of the SUL communication).

In some aspects, if the negative offset of the SUL transmission spans more than one symbol, then the ECP may be configured to span the entire negative offset portion of the SUL transmission. Alternatively, if the negative offset of the SUL transmission spans more than one symbol, the ECP may be limited to occur in at most one symbol, and full symbols of the negative start offset may be included as part of the PUSCH allocation (e.g., for TB size, rate matching, and/or the like). In some cases, this may lead to cross-TTI PUSCH transmissions. Alternatively, if the negative offset of the SUL transmission spans more than one symbol, then all full symbols that are part of the negative starting offset that are within the main PUSCH TTI are considered as part of PUSCH allocation (e.g., for TB size, rate matching, and/or the like). In this case, an ECP may be used for other portions of the negative starting offset. In some aspects, the length of the ECP and/or the number of symbols to be considered as part of the PUSCH allocation may be indicated in DCI (e.g., in the uplink grant).

Another timeline consideration when prioritizing SUL communication is a K1 value, which may represent a time between the end of a PDSCH communication to acknowledgement or negative acknowledgement (ACK/NACK) feedback corresponding to that PDSCH communication. The K1 value may be indicated in DCI (e.g., in a downlink grant) and/or in an RRC message. The K1 value may depend on a processing capability of the UE 120.

The same SUL priority over CG-UL described above for data channels (e.g., the PUSCH) may be applied to control channel (e.g., PUCCH) communications, such as by prioritizing ACK/NACK feedback for SUL over CG-UL. Thus, in some aspects, the PUCCH for ACK/NACK feedback may be configured to occur before the earliest negative starting offset for CG-UL. This means that the PUCCH at TTI n+k, where k represents the PDSCH to HARQ-ACK delay, will need to start with an ECP in the last one or two symbols of TTI n+k−1 when CG-UL is also configured slot in slot n+k, where n represents the PDSCH slot and n+k represents the PUCCH slot for ACK/NACK feedback. This is shown by reference number 905.

In some aspects, the downlink grant indication or the RRC indication for the value of k may be configured to be one or two symbols more than the K1 capability of the UE 120 when CG-UL is configured in slot n+k. The UE 120 is not expected to transmit ACK/NACK in a resource if the start time of the ECP is less than K1 symbols from the PDSCH. Similar options described above for the K2 timing apply to the K1 timing. For example, if the negative offset of the PUCCH transmission spans more than one symbol, then the ECP may be configured to span the entire negative offset portion of the PUCCH transmission. Alternatively, if the negative offset of the PUCCH transmission spans more than one symbol, the ECP may be limited to occur in at most one symbol.

Although some operations described in connection with FIGS. 5-9 are described in connection with mini-slots, these operations may also be performed in connection with slots. For example, these operations may be performed for slot-based scheduling when the UE 120 is configured with a sub-carrier spacing that satisfies a threshold (e.g., is greater than a threshold, such as greater than 15 kHz). Additionally, or alternatively, a set of starting offsets (e.g., a valid or permitted set of starting offsets) may be determined based at least in part on any combination of the slot type configurations, DMRS configurations, and/or sub-carrier spacing configurations described above. For example, a mini-slot configuration that includes four symbols may use a different set of starting offsets (e.g., three starting offsets) than a mini-slot configuration that includes two symbols (e.g., which may not allow multiple starting offsets).

As indicated above, FIG. 9 is provided as an example. Other examples may differ from what is described with regard to FIG. 9.

Figure 10:
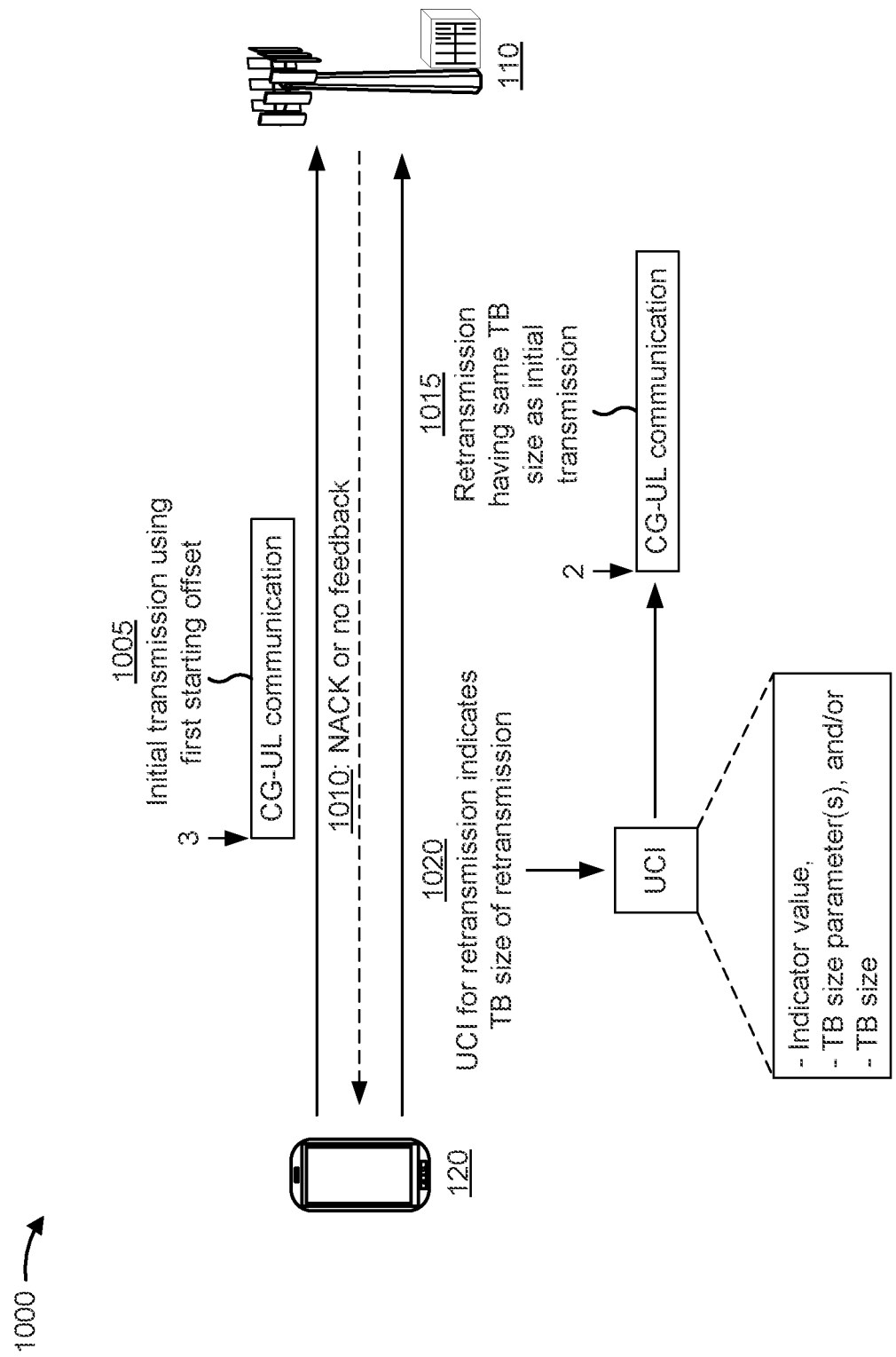

FIG. 10 is a diagram illustrating another example 1000 of configuring a starting offset for a CG-UL communication, in accordance with various aspects of the present disclosure.

As shown by reference number 1005, a UE 120 may transmit an initial transmission of a CG-UL communication using a first starting offset, shown as starting offset 3. As shown by reference number 1010, the UE 120 may receive a negative acknowledgement (NACK) from the base station 110 or may not receive acknowledgement or NACK (ACK/NACK) feedback from the base station 110 in response to the initial transmission of the CG-UL communication. Based at least in part on receiving the NACK or not receiving any ACK/NACK feedback, the UE 120 may transmit a retransmission of the CG-UL communication.

As shown by reference number 1015, the retransmission of the CG-UL communication may have a same transport block (TB) size as the initial transmission, but may be transmitted using a second starting offset, shown as starting offset 2. In some cases, the base station 110 may use the starting offset, which may be indicated in uplink control information (UCI) for the CG-UL communication (sometimes referred to as CG-UCI), to calculate a TB size for the retransmission. For example, the CG-UCI may indicate the starting offset or a starting symbol for a corresponding CG-UL communication. Because the retransmission may use a different starting offset than the initial transmission, the base station 110 may incorrectly calculate the TB size for the retransmission (which is the same as the TB size for the initial transmission). To assist the base station 110 with correct determination of the TB size, the CG-UCI for the retransmission may indicate the TB size of the retransmission, as shown by reference number 1020. In some aspects, the CG-UCI may separately indicate a starting offset and a TB size of a corresponding CG-UL communication.

In some aspects, the CG-UCI may include an indicator value that indicates whether a CG communication, that corresponds to the CG-UCI, is an initial transmission or a retransmission. For example, the indicator value may be a single bit that indicates an initial transmission or a retransmission. If the indicator value indicates that the corresponding CG communication is an initial transmission, then the base station 110 may use a starting offset for the initial transmission to determine the TB size for the initial transmission. If the indicator value indicates that the corresponding CG communication is a retransmission, then the base station 110 may use a starting offset for a previously received initial transmission to determine the TB size for the retransmission (e.g., if the base station 110 was able to successfully receive UCI for the initial transmission, which may indicate the starting offset for the initial transmission). If the base station 110 did not successfully receive UCI for the initial transmission, then the base station 110 may discard the retransmission and/or transmit a NACK for the retransmission. In this way, the indicator value may implicitly indicate the TB size of the retransmission.

In some aspects, the CG-UCI may indicate one or more parameters to be used to determine the TB size for a corresponding CG communication. The parameter(s) may include, for example, a starting offset of an initial transmission of the CG communication, a modulation and coding scheme (MCS) of the initial transmission, a set of frequency resources of the initial transmission, a number of symbols of the initial transmission, and/or the like. In some aspects, the CG-UCI may include only parameters that could potentially change from the initial transmission to the retransmission. In this way, the one or more parameters may implicitly indicate the TB size of the retransmission.

In some aspects, the CG-UCI may explicitly indicate the TB size. For example, the CG-UCI may include a field with a value that is set equal to the TB size of the corresponding CG communication.

In some cases, the TB size may change across different uplink transmissions (e.g., an initial transmission and one or more retransmissions) due to a change in a number of time domain resources (e.g., symbols) configured for different configured grant uplink (CG-UL) resources. For example, if an initial transmission uses a first CG-UL resource with a first number of symbols and a retransmission uses a second CG-UL resource with a second (e.g., different) number of symbols, then the initial transmission and the retransmission may have different TB sizes, and the base station 110 may be unable to determine the TB size, as described above. To prevent this issue, in some aspects, the number of time domain resources (e.g., symbols) allocated for all CG-UL resources is the same (e.g., the number of time domain resources allocated for a CG-UL communication may not be permitted to change for different transmissions of the CG-UL communication). Alternatively, the UE 120 may be required to use the same number of time domain resources (e.g., symbols) for different transmission of a CG-UL communication (e.g., for an initial transmission and each retransmission of the CG-UL communication). For example, the UE 120 may be restricted to use only a CG resource with the same number of time domain resources, for a retransmission, that the UE 120 used for the initial transmission.

Additionally, or alternatively, the base station 110 may configure the UE 120 to use a nominal number (or default number) of symbols to compute the TB size, regardless of the actual number of symbols in the CG resource used by the UE 120 to transmit the CG-UL communication. For example, the base station 110 may instruct the UE 120 to use three symbols to compute the TB size for a CG-UL communication even though the CG-UL communication may use a PUSCH configuration that is three symbols or four symbols in length. In some aspects, the nominal number of symbols may be based at least in part on a largest duration of all CG-UL resources configured for the UE 120, may be based at least in part on a smallest duration of all CG-UL resources configured for the UE 120, may be explicitly indicated by the base station 110 (e.g., for all CG-UL resources or for one or more sets of CG-UL resources), and/or the like. In some aspects, the nominal number of symbols indicated by the base station 110 may be different for different CG-UL resources depending on slot configuration associated with each CG-UL resource (e.g. a mini-slot CG-UL resource can have a different nominal number of symbols compared to a full slot CG-UL resource). Additionally, or alternatively, the UE 120 may indicate to the base station 110, in the CG-UCI, the number of symbols used by the UE 120 to calculate the TB size.

In some aspects, CG-UCI for a TTI (e.g., a slot, a mini-slot, and/or the like) may include information for multiple subsequent CG-UL communications, such as the number of subsequent TTIs that include CG-UL communications, information that identifies those TTIs, whether the CG-UL communications use slot-based scheduling or mini-slot-based scheduling, and/or the like. However, if the UE 120 is unable to transmit in a CG-UL TTI, then the UE 120 may not have sufficient processing time to update and/or re-encode CG-UCI for the subsequent CG-UL communications (e.g., to reduce an indication of a number of subsequent TTIs that include CG-UL communications and/or to adjust other information).

To compensate for this issue, the UE 120 may encode the CG-UCI to indicate the maximum number of CG-UL communications in queue to be transmitted. Because the base station 110 stores information regarding the number of TTIs configured for CG-UL communication, the base station 110 can determine the number of subsequent TTIs that include CG-UL communications. For example, the base station 110 may calculate the number as the minimum of the indicated number of CG-UL communications and a number of remaining TTI opportunities for the UE 120 to transmit CG-UL communications.

Additionally, or alternatively, the UE 120 may encode the CG-UCI to the indicate the last TTI (e.g., using a TTI number, a TTI identifier, a TTI index, and/or the like) that includes a CG-UL communication. In some aspects, this may be encoded by performing a modulo $2^n$ operation on a number of the last TTI, where n bits are available to indicate the last TTI number.

Additionally, or alternatively, the UE 120 may include an indication, in CG-UCI, that the number of CG-UL communications is unknown. In this case, the base station 110 may perform blind decoding on the CG-UL TTIs to attempt to receive available CG-UL communications.

As indicated above, FIG. 10 is provided as an example. Other examples may differ from what is described with regard to FIG. 10.

Figure 11:
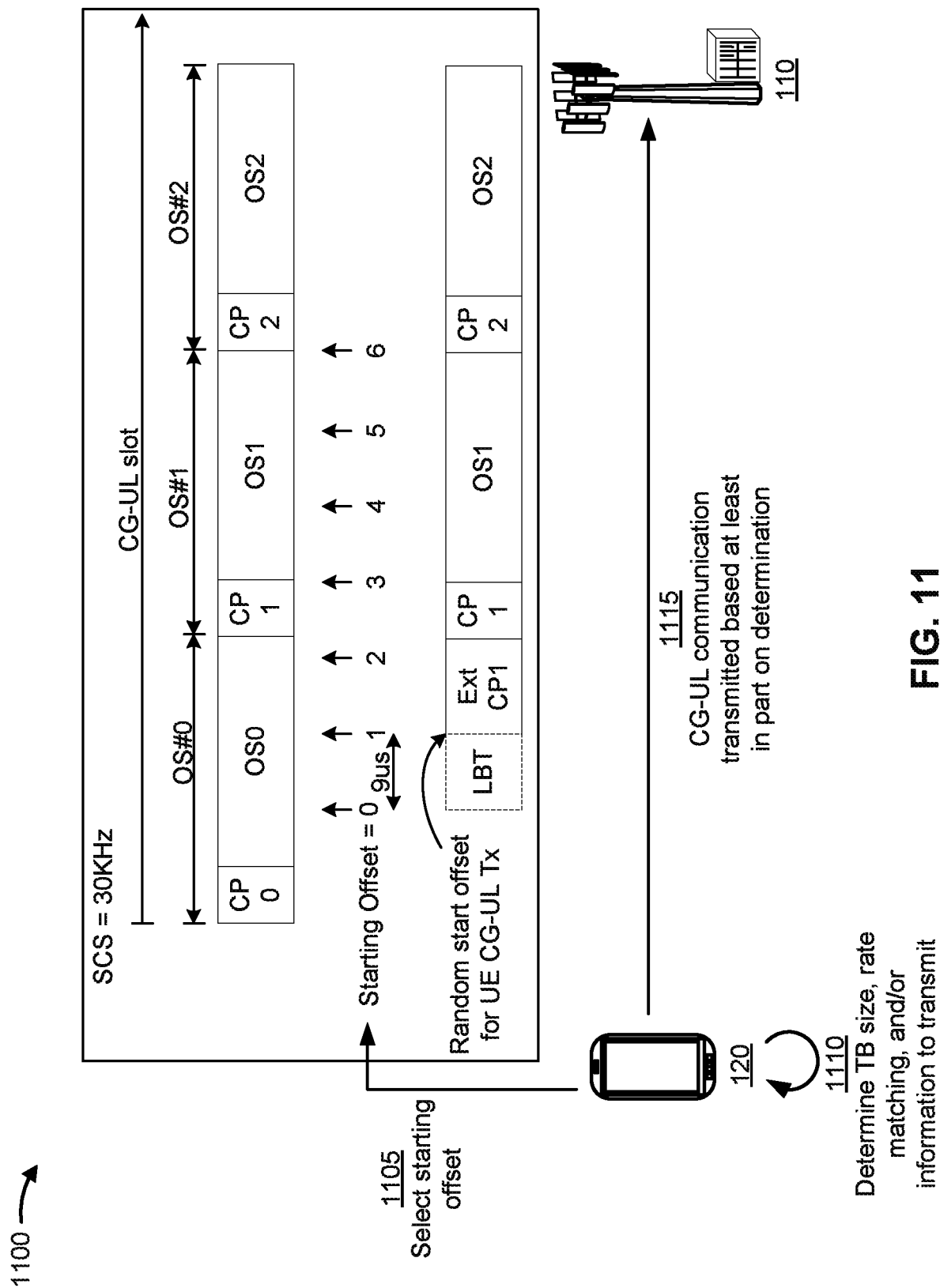

FIG. 11 is a diagram illustrating another example 1100 of configuring a starting offset for a CG-UL communication, in accordance with various aspects of the present disclosure. Some aspects described above in connection with FIGS. 5-9 modify a set of permitted starting offsets based at least in part on a slot type configuration, a DMRS configuration, and/or a sub-carrier spacing of a UE 120. Some aspects described below in connection with FIGS. 11 and 12 maintain a set of starting time configurations used for AUL (e.g., in LTE and/or LAA) and account for different slot type configurations and/or the like when determining TB size, rate matching, and/or information to be transmitted.

As shown by reference number 1105, a UE 120 may select a starting offset for a CG-UL communication, as described in more detail elsewhere herein. As shown by reference number 1110, the UE 120 may determine a TB size, a rate matching scheme, and/or information to be transmitted in the CG-UL communication after selecting the starting offset.

When determining TB size for a CG-UL communication, the TB size may be determined based at least in part on a number of symbols being transmitted for the CG-UL communication, the number of resource blocks to be used for the CG-UL communication, an MCS to be used for the CG-UL communication, and/or the like. The starting symbol and the ending symbol may be configured in DCI via a start and length indicator value (SLIV) for a scheduled uplink (SUL) communication. When the set of starting offsets spans multiple symbols, the actual starting symbol for the CG-UL communication may be different from the configured starting symbol (e.g., configured via an RRC configuration). This may lead to ambiguities between the UE 120 and the base station 110 regarding the number of symbols to be used for computing the TB size.

In some aspects, the TB size may be fixed, and may not depend on the actual starting symbol or the starting offset. For example, the TB size may be computed assuming that the first symbol (shown as OS #0) is always included in the number of symbols to be transmitted for the CG-UL communication (e.g., the TB size is computed based at least in part on an assumption of 14 symbols for a slot configuration that includes 14 symbols). Alternatively, the TB size may be computed assuming that the first symbol (shown as OS #0) is never included in the number of symbols to be transmitted for the CG-UL communication (e.g., the TB size is computed based at least in part on an assumption of 13 symbols for a slot configuration that includes 14 symbols). In some aspects, whether to include the first symbol in the number of symbols may be based at least in part on whether the first allowed start offset is equal to 0 µs or another threshold value (in which case the first symbol may be included in the number of symbols) or greater than 0 µs or the threshold value (in which case the first symbol may be excluded from the number of symbols).

In some aspects, the TB size may be based at least in part on the actual number of transmitted symbols. In example 1100, if the selected starting offset is 3 or more, which starts in the second symbol of the CG-UL slot, then a smaller TB size may be used as compared to offsets 0 through 2, which occur in the first symbol of the CG-UL slot.

In some aspects, the TB size may be determined based at least in part on the latest possible starting offset. This may represent a minimum number of uplink symbols in CG-UL. In example 1100, the TB size is computed assuming that the starting offset is 6 (e.g., assuming 12 symbols for a slot configuration that includes 14 symbols per slot).

In some aspects, the TB size determinations described above may only apply to CG-UL slots that use a starting offset. For example, after LBT succeeds, the starting offset may apply to the first CG-UL slot, but not to subsequent CG-UL slots. Thus, the TB size determination described above may apply to the first CG-UL slot, but not to subsequent CG-UL slots (unless those slots have a starting offset). Thus, in some aspects, the TB size computation for the subsequent CG-UL slots (e.g., those unaffected by multiple starting offsets) may assume that all symbols of those slots are used. However, in some cases, such as mini-slot-based scheduling and/or a high SCS (e.g., 60 KHz or higher), the TB computation for first N TTIs (where N is equal to 1, 2, or the like) may be different than the rest of the contiguously transmitted TTIs to allow for processing by the UE 120, such as to prepare packets for these N TTIs before determining the LBT outcome.

When determining a rate matching scheme for a CG-UL communication, the TB may be rate matched to the coded bits for transmission in the CG-UL symbols that are actually transmitted. The computation of the coded bits may depend on the number of transmitted symbols, which may vary depending on the selected starting offset.

In some aspects, the coded bits may be computed assuming that all symbols are transmitted. In this case, some coded bits may be punctured depending on the selected starting offset and which symbols are actually transmitted. In some aspects, the coded bits may be computed based at least in part on the selected starting offset (e.g., using the actually transmitted symbols). In some aspects, the coded bits may be computed assuming the worst case number of transmitted symbols (e.g., based at least in part on the largest and/or latest-occurring starting offset). In some aspects, the coded bits may be computed assuming that only the first symbol (OS #0) is lost due to starting offset. In this case, if the start offset is in OS #1 or a later symbol, the corresponding bits may be punctured.

In some aspects, the information to be transmitted in the CG-UL communication may depend on the selected starting offset, as described in more detail below in connection with FIG. 12.

As indicated above, FIG. 11 is provided as an example. Other examples may differ from what is described with regard to FIG. 11.

Figure 12:
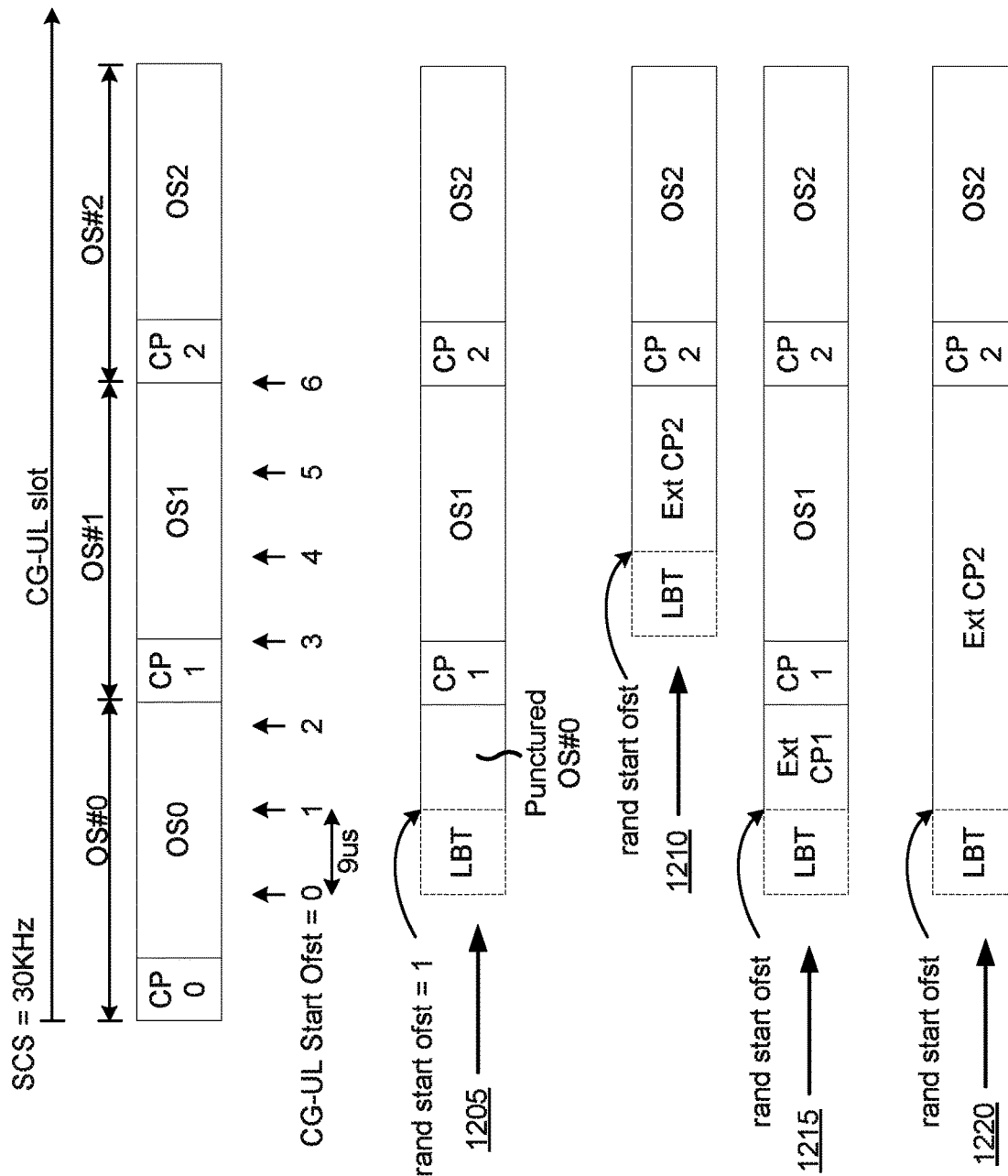

FIG. 12 is a diagram illustrating examples 1205-1220 of configuring a starting offset for a CG-UL communication, in accordance with various aspects of the present disclosure. As indicated above, in some aspects, the information to be transmitted in the CG-UL communication may depend on the selected starting offset.

As shown by example 1205, in some aspects, information (e.g., a waveform to be transmitted, bits to be transmitted, and/or the like) may be determined for all symbols in CG-UL, and the UE 120 may puncture the information (e.g., the waveform, the bits, and/or the like) that occurs prior to the selected starting offset. For example, if the randomly selected starting offset occurs in OS #0, then a portion of OS #0 that occurs prior to the starting offset may be punctured.

As shown by example 1210, if the starting offset occurs after the first symbol (OS #0), such as in OS #1, then the UE 120 may transmit, in OS #1, an ECP of OS #2 in a portion of OS #1 that starts at the starting offset, and may transmit full symbols starting at OS #2.

As shown by example 1215, if the starting offset occurs in the first symbol (OS #0), then the UE 120 may transmit an ECP of OS #1 until the start of OS #1 (e.g., in a portion of OS #0 that occurs at or later than the starting offset), and may transmit full symbols starting with OS #1. Alternatively, as shown by example 1220, if the starting offset occurs in the first symbol (OS #0), then the UE 120 may transmit an ECP of OS #2 until start of OS #2 (including the portion of OS #0 and all of OS #1), and may transmit full symbols starting at OS #2.

In some aspects, if the selected starting offset is less than or equal to a threshold (e.g., occurs in the first half of a symbol, occurs in a portion of a symbol that is earlier than a threshold, and/or the like), then the UE 120 may apply example 1205 described above. In some aspects, if the selected starting offset is greater than or equal to a threshold (e.g., occurs in the second half of a symbol, occurs in a portion of a symbol that is later than a threshold, and/or the like), then the UE 120 may apply one of examples 1210-1220 described above (e.g., depending on a starting symbol in which the starting offset occurs). Thus, the UE 120 may determine whether to puncture the symbol in which the starting offset occurs or whether to transmit an ECP of the next symbol based at least in part on the selected starting offset. In this way, if only a small part of the beginning of a symbol is lost (e.g., within a cyclic prefix portion of the symbol), then that part of the symbol may be punctured, and the UE 120 may potentially still transmit a portion of the cyclic prefix (e.g., depending on the starting offset). This may cause poor performance, but still some possibility to increase throughput due to a possibility of successfully decoding the data. However, if a large part of the symbol is lost (e.g., all of the cyclic prefix), then decoding may be difficult, so an ECP may be transmitted for the next symbol to achieve a performance gain for the next symbol.

Although some operations described in connection with FIGS. 11-12 are described in connection with a set of starting offsets than span two symbols, these operations may also be performed in connection with a set of starting offsets that span more than two symbols (e.g., for high SCS).

As indicated above, FIG. 12 is provided as an example. Other examples may differ from what is described with regard to FIG. 12.

Figure 13:
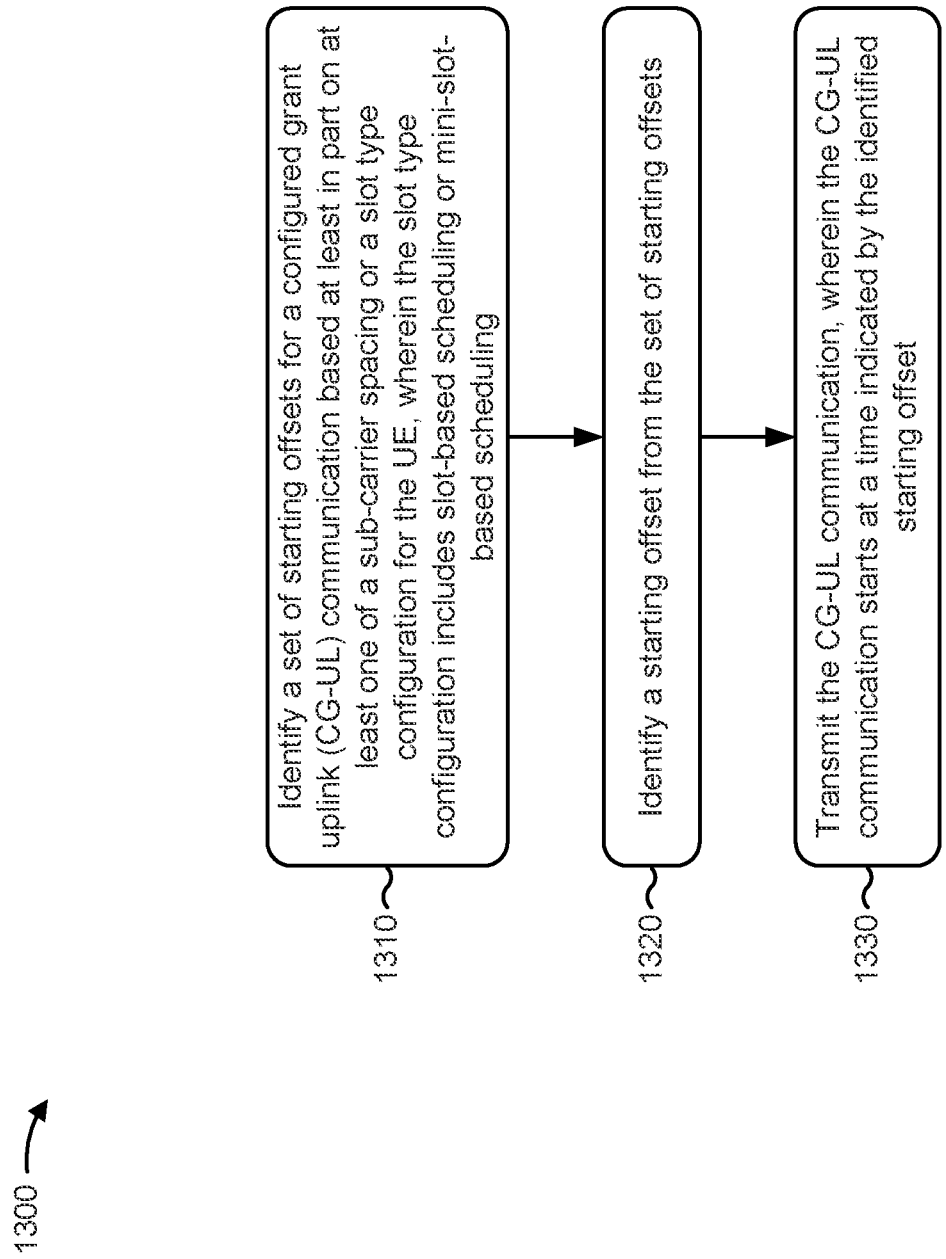
FIGS. 13-18 are diagrams illustrating example processes relating to configuring a starting offset for an uplink communication, in accordance with various aspects of the present disclosure.

FIG. 13 is a diagram illustrating an example process 1300 performed, for example, by a UE, in accordance with various aspects of the present disclosure. Example process 1300 is an example where a UE (e.g., UE 120 and/or the like) performs operations associated with configuring a starting offset for a configured grant uplink communication.

As shown in FIG. 13, in some aspects, process 1300 may include identifying a set of starting offsets for a configured grant uplink (CG-UL) communication based at least in part on at least one of a sub-carrier spacing or a slot type configuration for the UE, wherein the slot type configuration includes slot-based scheduling or mini-slot-based scheduling (block 1310). For example, the UE (e.g., using receive processor 258, transmit processor 264, controller/processor 280, memory 282, and/or the like) may identify a set of starting offsets for a configured grant uplink (CG-UL) communication based at least in part on at least one of a sub-carrier spacing or a slot type configuration for the UE, as described above. In some aspects, the slot type configuration includes slot-based scheduling or mini-slot-based scheduling.

As further shown in FIG. 13, in some aspects, process 1300 may include identifying a starting offset from the set of starting offsets (block 1320). For example, the UE (e.g., using receive processor 258, transmit processor 264, controller/processor 280, memory 282, and/or the like) may identify a starting offset from the set of starting offsets, as described above. In some aspects, the UE may identify a starting offset by randomly selecting a value from the set of starting offsets.

As further shown in FIG. 13, in some aspects, process 1300 may include transmitting the CG-UL communication, wherein the CG-UL communication starts at a time indicated by the identified starting offset (block 1330). For example, the UE (e.g., using receive processor 258, transmit processor 264, controller/processor 280, memory 282, and/or the like) may transmit the CG-UL communication, as described above. In some aspects, the CG-UL communication starts at a time indicated by the identified starting offset. In some aspects, the UE may transmit the CG-UL communication after a successful LBT operation.

Process 1300 may include additional aspects, such as any single implementation or any combination of aspects described below and/or in connection with one or more other processes described elsewhere herein.

In a first aspect, the set of starting offsets span multiple symbols.

In a second aspect, alone or in combination with the first aspect, the set of starting offsets is configured to include multiple starting offsets based at least in part on a determination that the slot type configuration for the UE includes multiple demodulation reference signals.

In a third aspect, alone or in combination with one or more of the first through second aspects, transmitting the CG-UL communication comprises: transmitting, in a first symbol that includes the time at which the CG-UL communication starts, an extended cyclic prefix of a second symbol that follows the first symbol; and transmitting the CG-UL communication in at least the second symbol.

In a fourth aspect, alone or in combination with one or more of the first through third aspects, the set of starting offsets is configured to indicate a corresponding set of times that are included in a single mini-slot or a single slot.

In a fifth aspect, alone or in combination with one or more of the first through fourth aspects, the set of starting offsets is configured to indicate a corresponding set of times that span multiple mini-slots or multiple slots.

In a sixth aspect, alone or in combination with one or more of the first through fifth aspects, transmitting the CG-UL communication comprises: transmitting, in a first mini-slot or a first slot that includes the time at which the CG-UL communication starts, an extended cyclic prefix of a starting symbol of a second mini-slot that follows the first mini-slot or of a second slot that follows the first slot; and transmitting the CG-UL communication in at least the second mini-slot or the second slot.

In a seventh aspect, alone or in combination with one or more of the first through sixth aspects, the set of starting offsets is configured to include at least one negative starting offset.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
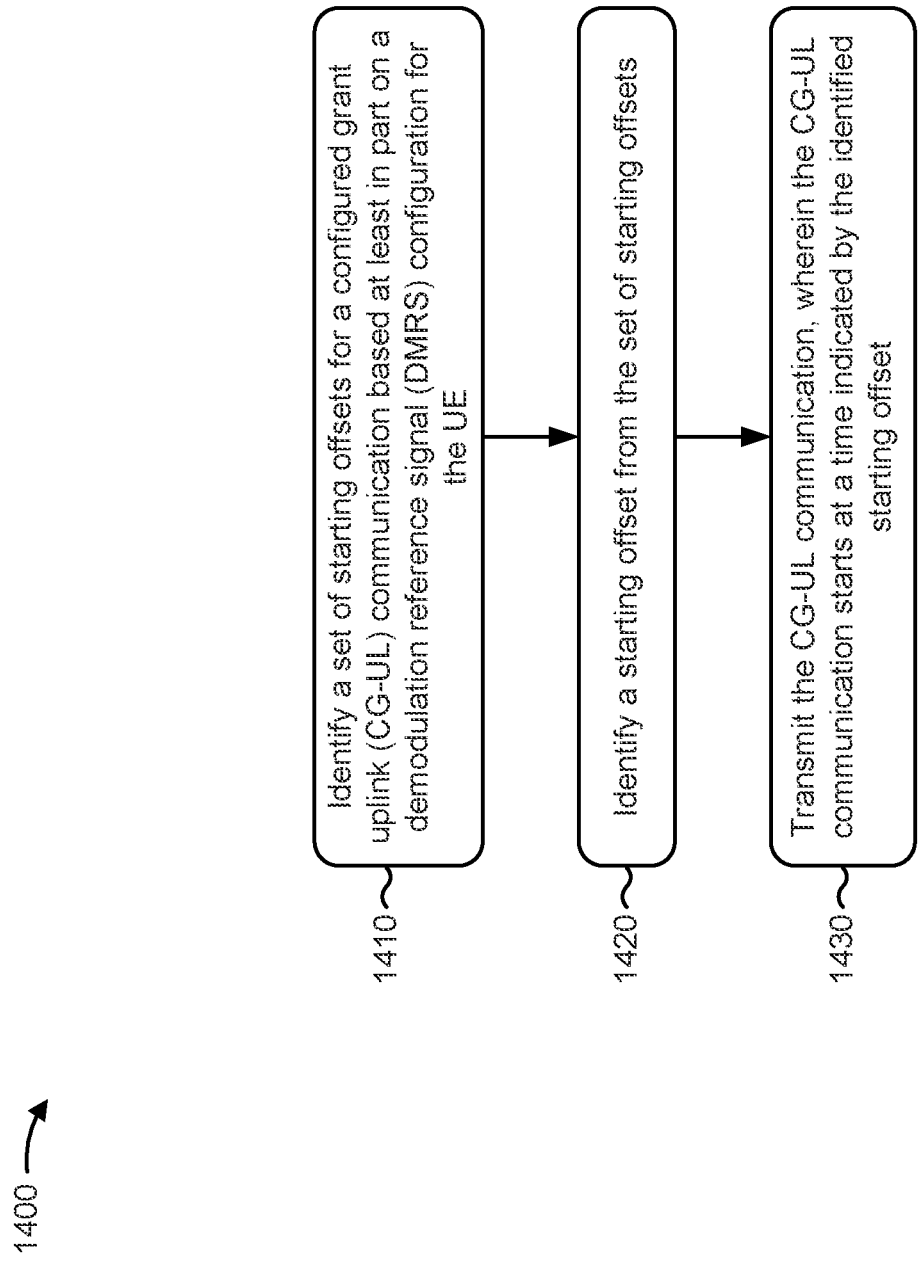

FIG. 14 is a diagram illustrating an example process 1400 performed, for example, by a UE, in accordance with various aspects of the present disclosure. Example process 1400 is an example where a UE (e.g., UE 120 and/or the like) performs operations associated with configuring a starting offset for a configured grant uplink communication.

As shown in FIG. 14, in some aspects, process 1400 may include identifying a set of starting offsets for a configured grant uplink (CG-UL) communication based at least in part on a demodulation reference signal (DMRS) configuration for the UE (block 1410). For example, the UE (e.g., using receive processor 258, transmit processor 264, controller/processor 280, memory 282, and/or the like) may identify a set of starting offsets for a configured grant uplink (CG-UL) communication based at least in part on a demodulation reference signal (DMRS) configuration for the UE, as described above.

As further shown in FIG. 14, in some aspects, process 1400 may include identifying a starting offset from the set of starting offsets (block 1420). For example, the UE (e.g., using receive processor 258, transmit processor 264, controller/processor 280, memory 282, and/or the like) may identify a starting offset from the set of starting offsets, as described above.

As further shown in FIG. 14, in some aspects, process 1400 may include transmitting the CG-UL communication, wherein the CG-UL communication starts at a time indicated by the identified starting offset (block 1430). For example, the UE (e.g., using receive processor 258, transmit processor 264, controller/processor 280, memory 282, and/or the like) may transmit the CG-UL communication, as described above. In some aspects, the CG-UL communication starts at a time indicated by the identified starting offset.

Process 1400 may include additional aspects, such as any single implementation or any combination of aspects described below and/or in connection with one or more other processes described elsewhere herein.

In a first aspect, the DMRS indicates information associated with the selected starting offset.

In a second aspect, alone or in combination with the first aspect, the set of starting offsets occur prior to a configured DMRS transmission.

In a third aspect, alone or in combination with one or more of the first through second aspects, the set of starting offsets occur prior to a configured DMRS transmission based at least in part on a determination that the UE is configured with slot-based scheduling.

In a fourth aspect, alone or in combination with one or more of the first through third aspects, the set of starting offsets is configured to include only a single starting offset based at least in part on a determination that the UE is configured with mini-slot-based scheduling.

In a fifth aspect, alone or in combination with one or more of the first through fourth aspects, the set of starting offsets is configured to include only a single starting offset based at least in part on a determination that the DMRS configuration for the UE includes only a single DMRS.

In a sixth aspect, alone or in combination with one or more of the first through fifth aspects, the set of starting offsets is configured to include multiple starting offsets based at least in part on a determination that the DMRS configuration for the UE includes multiple DMRSs.

In a seventh aspect, alone or in combination with one or more of the first through sixth aspects, transmitting the CG-UL communication comprises puncturing a DMRS with the CG-UL communication based at least in part on a determination that the DMRS configuration for the UE includes multiple DMRSs.

In an eighth aspect, alone or in combination with one or more of the first through seventh aspects, a DMRS is configured to be transmitted after the time indicated by the selected starting offset.

In a ninth aspect, alone or in combination with one or more of the first through eighth aspects, a DMRS is configured to be transmitted after a latest-occurring time indicated by the set of starting offsets.

In a tenth aspect, alone or in combination with one or more of the first through ninth aspects, the DMRS configuration indicates different time domain locations for DMRS transmission for different starting offsets of the set of starting offsets.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
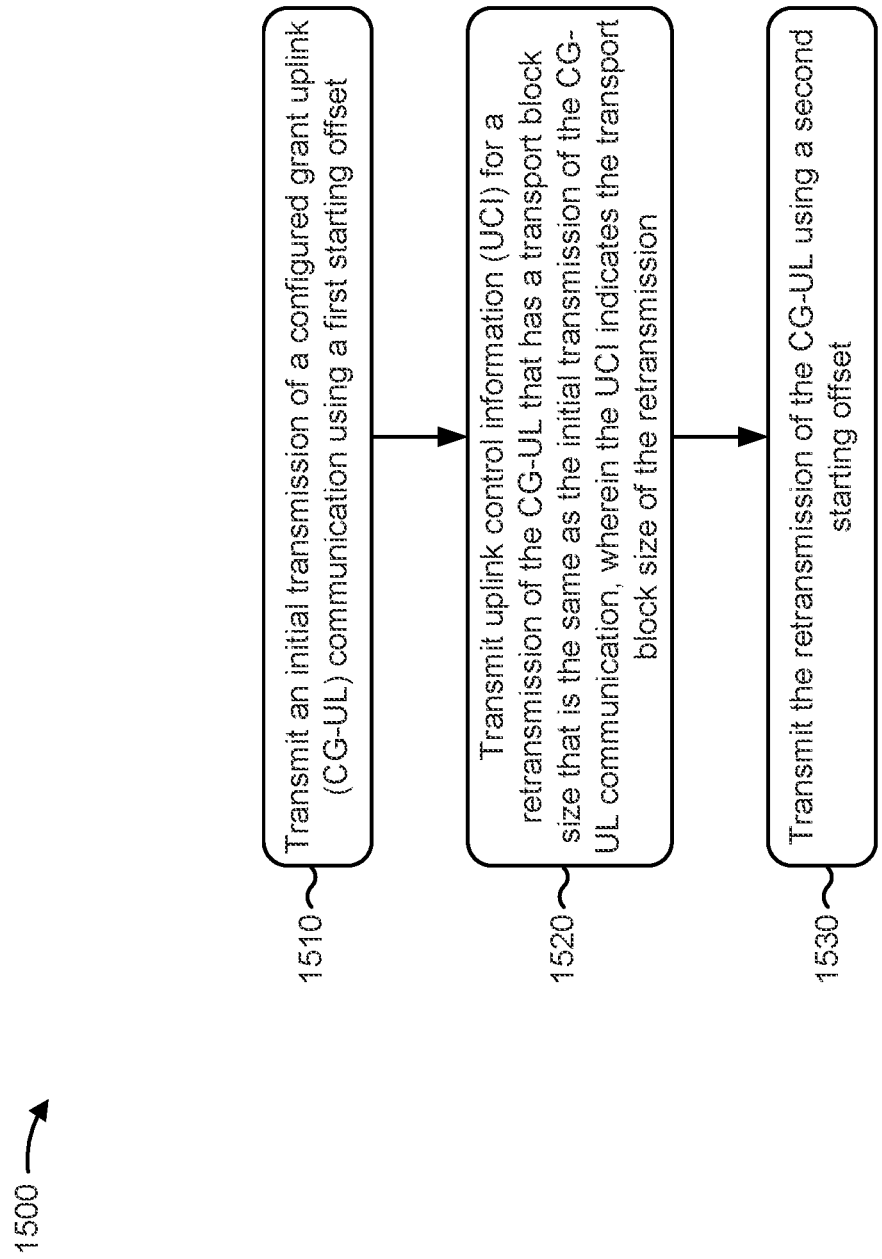

FIG. 15 is a diagram illustrating an example process 1500 performed, for example, by a UE, in accordance with various aspects of the present disclosure. Example process 1500 is an example where a UE (e.g., UE 120 and/or the like) performs operations associated with configuring a starting offset for a configured grant uplink communication.

As shown in FIG. 15, in some aspects, process 1500 may include transmitting an initial transmission of a configured grant uplink (CG-UL) communication using a first starting offset (block 1510). For example, the UE (e.g., using receive processor 258, transmit processor 264, controller/processor 280, memory 282, and/or the like) may transmit an initial transmission of a configured grant uplink (CG-UL) communication using a first starting offset, as described above.

As further shown in FIG. 15, in some aspects, process 1500 may include transmitting uplink control information (UCI) for a retransmission of the CG-UL communication that has a transport block size that is the same as the initial transmission of the CG-UL communication, wherein the UCI indicates the transport block size of the retransmission (block 1520). For example, the UE (e.g., using receive processor 258, transmit processor 264, controller/processor 280, memory 282, and/or the like) may transmit uplink control information (UCI) for a retransmission of the CG- UL communication that has a transport block size that is the same as the initial transmission of the CG-UL communication, as described above. In some aspects, the UCI indicates the transport block size of the retransmission.

As further shown in FIG. 15, in some aspects, process 1500 may include transmitting the retransmission of the CG-UL communication using a second starting offset (block 1530). For example, the UE (e.g., using receive processor 258, transmit processor 264, controller/processor 280, memory 282, and/or the like) may transmit the retransmission of the CG-UL communication using a second starting offset, as described above.

Process 1500 may include additional aspects, such as any single implementation or any combination of aspects described below and/or in connection with one or more other processes described elsewhere herein.

In a first aspect, the transport block size of the retransmission is implicitly indicated using an indicator value, in the UCI, that identifies the retransmission of the CG-UL communication as a retransmission and not an initial transmission.

In a second aspect, alone or in combination with the first aspect, the transport block size of the retransmission is implicitly indicated by indicating, in the UCI, one or more parameters to be used to determine the transport block size.

In a third aspect, alone or in combination with one or more of the first through second aspects, the one or more parameters include the first starting offset.

In a fourth aspect, alone or in combination with one or more of the first through third aspects, the one or more parameters include at least one of a modulation and coding scheme of the initial transmission, a set of frequency resources of the initial transmission, a number of symbols of the initial transmission, or a combination thereof.

In a fifth aspect, alone or in combination with one or more of the first through fourth aspects, the transport block size is explicitly indicated in the UCI.

In a sixth aspect, alone or in combination with one or more of the first through fifth aspects, a number of time domain resources is not permitted to change for different transmissions of the CG-UL communication.

In a seventh aspect, alone or in combination with one or more of the first through sixth aspects, the UE is required to use a same number of time domain resources for different transmissions of the CG-UL communication.

In an eighth aspect, alone or in combination with one or more of the first through seventh aspects, the UE is configured to use a default number of symbols to compute the transport block size.

In a ninth aspect, alone or in combination with one or more of the first through eighth aspects, the UCI indicates a number of symbols used by the UE to compute the transport block size.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

Figure 16:
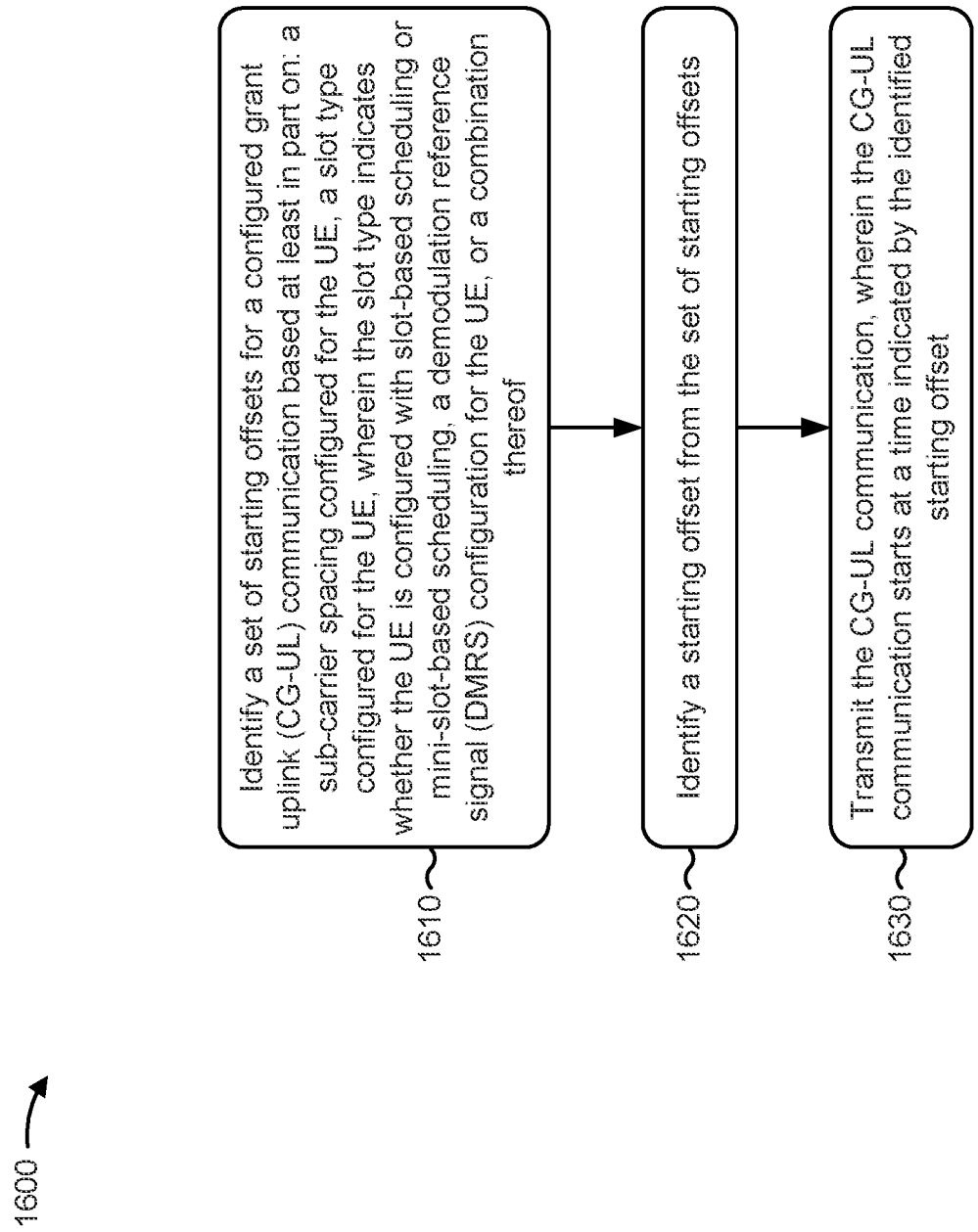

FIG. 16 is a diagram illustrating an example process 1600 performed, for example, by a UE, in accordance with various aspects of the present disclosure. Example process 1600 is an example where a UE (e.g., UE 120 and/or the like) performs operations associated with configuring a starting offset for a configured grant uplink communication.

As shown in FIG. 16, in some aspects, process 1600 may include identifying a set of starting offsets for a configured grant uplink (CG-UL) communication based at least in part on: a sub-carrier spacing configured for the UE, a slot type configured for the UE, a demodulation reference signal (DMRS) configuration for the UE, or a combination thereof (block 1610). For example, the UE (e.g., using receive processor 258, transmit processor 264, controller/processor 280, memory 282, and/or the like) may identify a set of starting offsets for a configured grant uplink (CG-UL) communication based at least in part on a sub-carrier spacing configured for the UE, a slot type configured for the UE, a demodulation reference signal (DMRS) configuration for the UE, or a combination thereof, as described above. In some aspects, the slot type indicates whether the UE is configured with slot-based scheduling or mini-slot-based scheduling.

As further shown in FIG. 16, in some aspects, process 1600 may include identifying a starting offset from the set of starting offsets (block 1620). For example, the UE (e.g., using receive processor 258, transmit processor 264, controller/processor 280, memory 282, and/or the like) may identify a starting offset from the set of starting offsets, as described above.

As further shown in FIG. 16, in some aspects, process 1600 may include transmitting the CG-UL communication, wherein the CG-UL communication starts at a time indicated by the identified starting offset (block 1630). For example, the UE (e.g., using receive processor 258, transmit processor 264, controller/processor 280, memory 282, and/or the like) may transmit the CG-UL communication, as described above. In some aspects, the CG-UL communication starts at a time indicated by the identified starting offset.

Process 1600 may include additional aspects, such as any single implementation or any combination of aspects described below and/or in connection with one or more other processes described elsewhere herein.

In a first aspect, the DMRS configuration indicates at least one of a DMRS pattern, a DMRS location, a number of DMRSs, or a combination thereof.

Although FIG. 16 shows example blocks of process 1600, in some aspects, process 1600 may include additional blocks, fewer blocks, different blocks, or differently arranged blocks than those depicted in FIG. 16. Additionally, or alternatively, two or more of the blocks of process 1600 may be performed in parallel.

Figure 17:
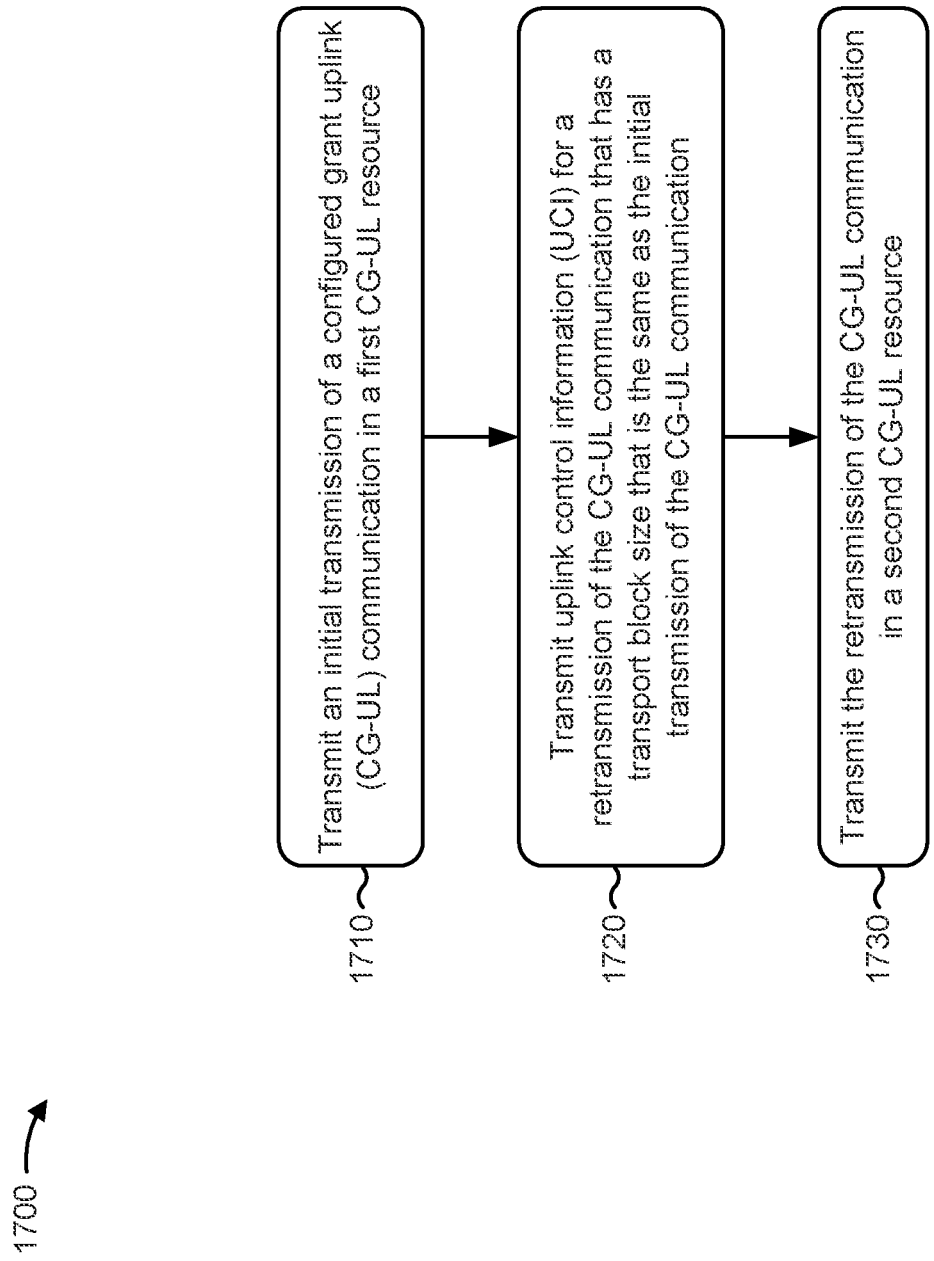

FIG. 17 is a diagram illustrating an example process 1700 performed, for example, by a UE, in accordance with various aspects of the present disclosure. Example process 1700 is an example where a UE (e.g., UE 120 and/or the like) performs operations associated with configuring a starting offset for a configured grant uplink communication.

As shown in FIG. 17, in some aspects, process 1700 may include transmitting an initial transmission of a configured grant uplink (CG-UL) communication in a first CG-UL resource (block 1710). For example, the UE (e.g., using receive processor 258, transmit processor 264, controller/processor 280, memory 282, and/or the like) may transmit an initial transmission of a CG-UL communication in a first CG-UL resource, as described above.

As further shown in FIG. 17, in some aspects, process 1700 may include transmitting uplink control information (UCI) for a retransmission of the CG-UL communication that has a transport block size that is the same as the initial transmission of the CG-UL communication (block 1720). For example, the UE (e.g., using receive processor 258, transmit processor 264, controller/processor 280, memory 282, and/or the like) may transmit UCI for a retransmission of the CG-UL communication that has a transport block size that is the same as the initial transmission of the CG-UL communication, as described above.

As further shown in FIG. 17, in some aspects, process 1700 may include transmitting the retransmission of the CG-UL communication in a second CG-UL resource (block 1730). For example, the UE (e.g., using receive processor 258, transmit processor 264, controller/processor 280, memory 282, and/or the like) may transmit the retransmission of the CG-UL communication in a second CG-UL resource, as described above.

Process 1700 may include additional aspects, such as any single implementation or any combination of aspects described below and/or in connection with one or more other processes described elsewhere herein.

In a first aspect, a number of time domain resources configured for the first CG-UL resource is not allowed to be different from a number of time domain resources configured for the second CG-UL resource.

In a second aspect, alone or in combination with the first aspect, the UE is configured to refrain from transmitting the retransmission of the CG-UL communication if a number of time domain resources for the second CG-UL resource is different from a number of time domain resources for the first CG-UL resource.

In a third aspect, alone or in combination with one or more of the first through second aspects, the UE is configured to use a nominal number of symbols to compute the transport block size for different transmissions of the same CG-UL communication.

In a fourth aspect, alone or in combination with one or more of the first through third aspects, the UCI indicates a number of symbols used by the UE to compute the transport block size.

Although FIG. 17 shows example blocks of process 1700, in some aspects, process 1700 may include additional blocks, fewer blocks, different blocks, or differently arranged blocks than those depicted in FIG. 17. Additionally, or alternatively, two or more of the blocks of process 1700 may be performed in parallel.

Figure 18:
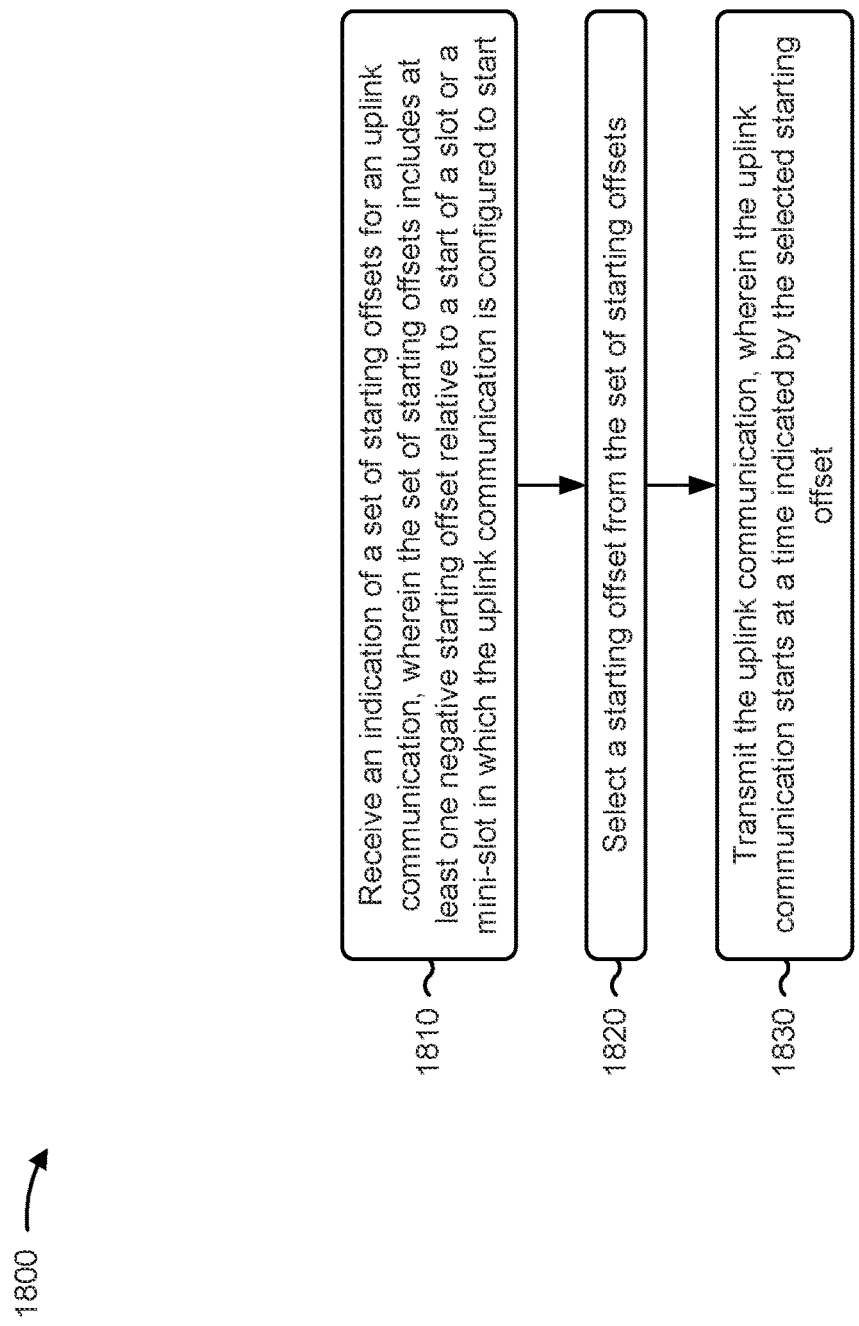

FIG. 18 is a diagram illustrating an example process 1800 performed, for example, by a UE, in accordance with various aspects of the present disclosure. Example process 1800 is an example where the UE (e.g., UE 120 and/or the like) performs operations associated with configuring a starting offset for an uplink communication.

As shown in FIG. 18, in some aspects, process 1800 may include receiving an indication of a set of starting offsets for an uplink communication, wherein the set of starting offsets includes at least one negative starting offset relative to a start of a slot or a mini-slot in which the uplink communication is configured to start (block 1810). For example, the UE (e.g., using receive processor 258, controller/processor 280, memory 282, antenna 252, and/or the like) may receive an indication of a set of starting offsets for an uplink communication, as described above. In some aspects, the set of starting offsets includes at least one negative starting offset relative to a start of a slot or a mini-slot in which the uplink communication is configured to start.

As further shown in FIG. 18, in some aspects, process 1800 may include selecting a starting offset from the set of starting offsets (block 1820). For example, the UE (e.g., using receive processor 258, controller/processor 280, memory 282, and/or the like) may select a starting offset from the set of starting offsets, as described above.

As further shown in FIG. 18, in some aspects, process 1800 may include transmitting the uplink communication, wherein the uplink communication starts at a time indicated by the selected starting offset (block 1830). For example, the UE (e.g., using transmit processor 264, controller/processor 280, memory 282, antenna 252, and/or the like) may transmit the uplink communication, as described above. In some aspects, the uplink communication starts at a time indicated by the selected starting offset.

Process 1800 may include additional aspects, such as any single aspect or any combination of aspects described below and/or in connection with one or more other processes described elsewhere herein.

In a first aspect, the starting offset is randomly selected from the set of starting offsets.

In a second aspect, alone or in combination with the first aspect, the uplink communication is a configured grant uplink (CG-UL) communication.

In a third aspect, alone or in combination with one or more of the first and second aspects, transmitting the CG-UL communication comprises: transmitting, in a first symbol that includes the time at which the CG-UL communication starts, an extended cyclic prefix of a second symbol that follows the first symbol, and transmitting the CG-UL communication in at least the second symbol.

In a fourth aspect, alone or in combination with one or more of the first through third aspects, transmitting the CG-UL communication comprises: transmitting, in a first mini-slot or a first slot that includes the time at which the CG-UL communication starts, an extended cyclic prefix of a starting symbol of a second mini-slot that follows the first mini-slot or of a second slot that follows the first slot, and transmitting the CG-UL communication in at least the second mini-slot or the second slot.

In a fifth aspect, alone or in combination with one or more of the first through fourth aspects, process 1800 includes performing a listen before talk procedure prior to the selected starting offset; and transmitting the uplink communication based at least in part on a determination that the listen before talk procedure is successful.

In a sixth aspect, alone or in combination with one or more of the first through fifth aspects, the set of starting offsets span multiple symbols.

In a seventh aspect, alone or in combination with one or more of the first through sixth aspects, the set of starting offsets span one or more symbols of a slot or a mini-slot prior to the slot or the mini-slot in which the uplink communication is configured to start.

In an eighth aspect, alone or in combination with one or more of the first through seventh aspects, the set of starting offsets is based at least in part on a demodulation reference signal configuration for the UE.

In a ninth aspect, alone or in combination with one or more of the first through eighth aspects, an uplink grant for a scheduled uplink communication is required to occur at least a threshold number of symbols before a symbol corresponding to the at least one negative starting offset.

In a tenth aspect, alone or in combination with one or more of the first through ninth aspects, the threshold number is based at least in part on a UE processing capability.

In an eleventh aspect, alone or in combination with one or more of the first through tenth aspects, process 1800 includes dropping the scheduled uplink communication based at least in part on a determination that the uplink grant does not occur at least the threshold number of symbols before the symbol corresponding to the at least one negative starting offset.

Although FIG. 18 shows example blocks of process 1800, in some aspects, process 1800 may include additional blocks, fewer blocks, different blocks, or differently arranged blocks than those depicted in FIG. 18. Additionally, or alternatively, two or more of the blocks of process 1800 may be performed in parallel.

Figure 19:
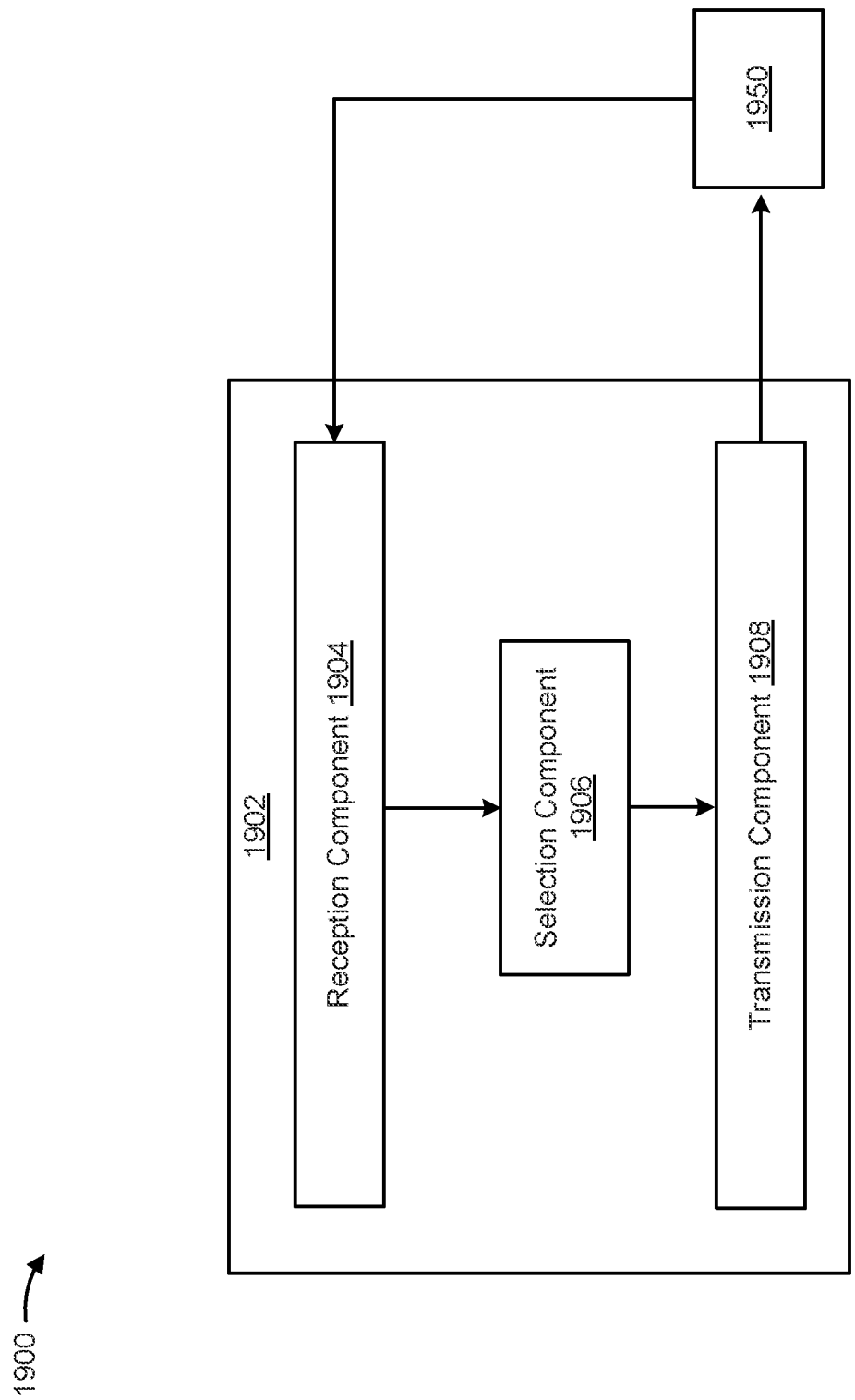
FIG. 19 is a conceptual data flow diagram illustrating the data flow between different components in an example apparatus.

FIG. 19 is a conceptual data flow diagram 1900 illustrating the data flow between different components in an example apparatus 1902. The apparatus 1902 may be a UE. In some aspects, the apparatus 1902 includes a reception component 1904, a selection component 1906, and/or a transmission component 1908.

In some aspects, the reception component 1904 may receive (e.g., from an apparatus 1950, such as a base station) an indication of a set of starting offsets for an uplink communication. The set of starting offsets may include at least one negative starting offset relative to a start of a slot or a mini-slot in which the uplink communication is configured to start. The selection component 1906 may select a starting offset from the set of starting offsets (e.g., randomly). The transmission component 1908 may transmit the uplink communication. The uplink communication may start at a time indicated by the identified starting offset.

The apparatus may include additional components that perform each of the blocks of the algorithm in the aforementioned process 1300 of FIG. 13, process 1400 of FIG. 14, process 1500 of FIG. 15, process 1600 of FIG. 16, process 1700 of FIG. 17, process 1800 of FIG. 18, and/or the like. Each block in the aforementioned process 1300 of FIG. 13, process 1400 of FIG. 14, process 1500 of FIG. 15, process 1600 of FIG. 16, process 1700 of FIG. 17, process 1800 of FIG. 18, and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 19 are provided as an example. In practice, there may be additional components, fewer components, different components, or differently arranged components than those shown in FIG. 19. Furthermore, two or more components shown in FIG. 19 may be implemented within a single component, or a single component shown in FIG. 19 may be implemented as multiple, distributed components. Additionally, or alternatively, a set of components (e.g., one or more components) shown in FIG. 19 may perform one or more functions described as being performed by another set of components shown in FIG. 19.

Figure 20:
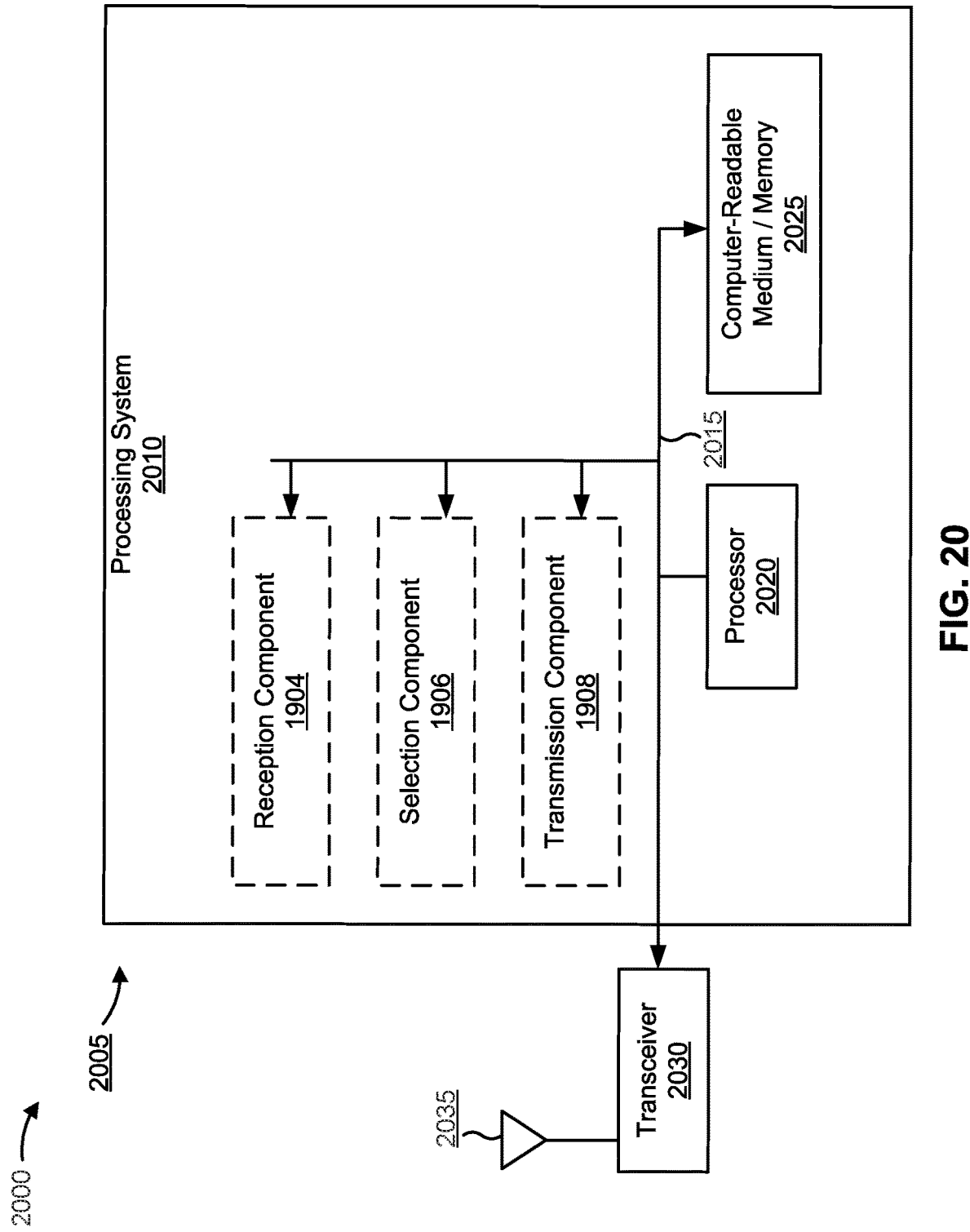
FIG. 20 is a diagram illustrating an example of a hardware implementation for an apparatus employing a processing system.

FIG. 20 is a diagram 2000 illustrating an example of a hardware implementation for an apparatus 2005 employing a processing system 2010. The apparatus 2005 may be a UE.

The processing system 2010 may be implemented with a bus architecture, represented generally by the bus 2015. The bus 2015 may include any number of interconnecting buses and bridges depending on the specific application of the processing system 2010 and the overall design constraints. The bus 2015 links together various circuits including one or more processors and/or hardware components, represented by the processor 2020, the components 1904, 1906, and/or 1908, and the computer-readable medium/memory 2025. The bus 2015 may also link various other circuits such as timing sources, peripherals, voltage regulators, and power management circuits, which are well known in the art, and therefore will not be described any further.

The processing system 2010 may be coupled to a transceiver 2030. The transceiver 2030 is coupled to one or more antennas 2035. The transceiver 2030 provides a means for communicating with various other apparatuses over a transmission medium. The transceiver 2030 receives a signal from the one or more antennas 2035, extracts information from the received signal, and provides the extracted information to the processing system 2010, specifically the reception component 1904. In addition, the transceiver 2030 receives information from the processing system 2010, specifically the transmission component 1908, and based at least in part on the received information, generates a signal to be applied to the one or more antennas 2035.

The processing system 2010 includes a processor 2020 coupled to a computer-readable medium/memory 2025. The processor 2020 is responsible for general processing, including the execution of software stored on the computer-readable medium/memory 2025. The software, when executed by the processor 2020, causes the processing system 2010 to perform the various functions described herein for any particular apparatus. The computer-readable medium/memory 2025 may also be used for storing data that is manipulated by the processor 2020 when executing software. The processing system further includes at least one of the components 1904, 1906, and/or 1908. The components may be software modules running in the processor 2020, resident/stored in the computer readable medium/memory 2025, one or more hardware modules coupled to the processor 2020, or some combination thereof.

In some aspects, the processing system 2010 may be a component of the UE 120 and may include the memory 282 and/or at least one of the TX MIMO processor 266, the RX processor 258, and/or the controller/processor 280. In some aspects, the apparatus 2005 for wireless communication includes means for identifying a set of starting offsets for an uplink communication, wherein the set of starting offsets includes at least one negative starting offset relative to a start of a slot or a mini-slot in which the uplink communication is configured to start; means for selecting a starting offset from the set of starting offsets; means for transmitting the uplink communication, wherein the uplink communication starts at a time indicated by the identified starting offset; and/or the like. Additionally, or alternatively, the apparatus 2005 for wireless communication includes means for performing one or more blocks the blocks of the algorithm in the aforementioned process 1300 of FIG. 13, process 1400 of FIG. 14, process 1500 of FIG. 15, process 1600 of FIG. 16, process 1700 of FIG. 17, process 1800 of FIG. 18, and/or the like. The aforementioned means may be one or more of the aforementioned components of the apparatus 1902 and/or the processing system 2010 of the apparatus 2005 configured to perform the functions recited by the aforementioned means. As described elsewhere herein, the processing system 2010 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 20 is provided as an example. Other examples may differ from what is described in connection with FIG. 20.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    identity a starting offset, of a set of starting offsets, for an uplink communication, wherein the starting offset, in a first symbol, is relative to a start of a second symbol in a slot in which the uplink communication is scheduled to start, wherein the first symbol occurs prior to the second symbol, and wherein an uplink grant occurs at least a threshold number of symbols before the first symbol; and
    transmitting the uplink communication, wherein the uplink communication starts at a time based at least in part on the starting offset.

2. The method of claim 1, wherein the starting offset is identified based at least in part on a random selection of a value associated with the set of starting offsets.

3. The method of claim 1, wherein the uplink communication is a configured grant uplink (CG-UL) communication.

4. The method of claim 3, wherein transmitting the CG-UL communication comprises:
    transmitting, in the first symbol, an extended cyclic prefix of the second symbol; and
    transmitting the CG-UL communication in at least the second symbol.

5. The method of claim 3, wherein transmitting the CG-UL communication comprises:
    transmitting, in a first mini-slot or a first slot, an extended cyclic prefix of a starting symbol of a second mini-slot that follows the first mini-slot or of a second slot that follows the first slot; and
    transmitting the CG-UL communication in at least the second mini-slot or the second slot.

6. The method of claim 1, further comprising:
    performing a listen before talk procedure prior to the starting offset; and
    transmitting the uplink communication based at least in part on a determination that the listen before talk procedure is successful.

7. The method of claim 1, wherein the set of starting offsets span multiple symbols, and
    wherein the multiple symbols include the first symbol.

8. The method of claim 1, wherein the set of starting offsets span one or more symbols of a slot or a mini-slot prior to the slot in which the uplink communication is scheduled to start, and
    wherein the one or more symbols include the first symbol.

9. The method of claim 1, wherein the set of starting offsets is based at least in part on a demodulation reference signal configuration for the UE.

10. The method of claim 1, wherein the second symbol is an orthogonal frequency-division multiple (OFDM) symbol.

11. A user equipment (UE) for wireless communication, comprising:
    one or more memories; and
    one or more processors, coupled to the one or more memories, configured to:
        identify a starting offset, of a set of starting offsets for an uplink communication, wherein the starting offset, in a first symbol, is relative to a start of a second symbol in a slot in which the uplink communication is scheduled to start, wherein the first symbol occurs prior to the second symbol, and wherein an uplink grant occurs at least a threshold number of symbols before the first symbol; and
        transmit the uplink communication, wherein the uplink communication starts at a time based at least in part on the starting offset.

12. The UE of claim 11, wherein the starting offset is identified based at least in part on a random selection of a value associated with the set of starting offsets.

13. The UE of claim 11, wherein the uplink communication is a configured grant uplink (CG-UL) communication.

14. The UE of claim 13, wherein the one or more processors, when transmitting the CG-UL communication, are configured to:
  transmit, in the first symbol, an extended cyclic prefix of the second symbol; and
  transmit the CG-UL communication in at least the second symbol.

15. The UE of claim 13, wherein the one or more processors, when transmitting the CG-UL communication, are configured to:
  transmit, in a first mini-slot or a first slot, an extended cyclic prefix of a starting symbol of a second mini-slot that follows the first mini-slot or of a second slot that follows the first slot; and
  transmit the CG-UL communication in at least the second mini-slot or the second slot.

16. The UE of claim 11, wherein the one or more processors are further configured to:
  perform a listen before talk procedure prior to the starting offset; and
  transmit the uplink communication based at least in part on a determination that the listen before talk procedure is successful.

17. The UE of claim 11, wherein the set of starting offsets span multiple symbols, and
  wherein the multiple symbols include the first symbol.

18. The UE of claim 11, wherein the set of starting offsets span one or more symbols of a slot or a mini-slot prior to the slot in which the uplink communication is scheduled to start, and
  wherein the one or more symbols include the first symbol.

19. The UE of claim 11, wherein the second symbol is an orthogonal frequency-division multiple (OFDM) symbol.

20. The UE of claim 11, wherein the uplink grant comprises downlink control information (DCI).

21. A non-transitory computer-readable medium storing one or more instructions for wireless communication, the one or more instructions comprising:
  one or more instructions that, when executed by one or more processors of a user equipment (UE), cause the one or more processors to:
  identify a starting offset, of a set of starting offsets for an uplink communication, wherein the starting offset, in a first symbol, is relative to a start of a second symbol in a slot in which the uplink communication is scheduled to start, wherein the first symbol occurs prior to the second symbol, and wherein an uplink grant occurs at least a threshold number of symbols before the first symbol; and
  transmit the uplink communication, wherein the uplink communication starts at a time based at least in part on the starting offset.

* * * * *